United States Patent
Sawada et al.

(10) Patent No.: US 8,824,006 B2
(45) Date of Patent: Sep. 2, 2014

(54) COLOR CORRECTION APPARATUS AND COLOR CORRECTION METHOD

(75) Inventors: Takayuki Sawada, Shizuoka-ken (JP); Naofumi Yamamoto, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/207,892

(22) Filed: Aug. 11, 2011

(65) Prior Publication Data
US 2012/0044509 A1 Feb. 23, 2012

Related U.S. Application Data

(60) Provisional application No. 61/376,018, filed on Aug. 23, 2010, provisional application No. 61/425,943, filed on Dec. 22, 2010.

(51) Int. Cl.
H04N 1/46 (2006.01)
G06F 3/12 (2006.01)
G03F 3/08 (2006.01)
H01J 5/16 (2006.01)

(52) U.S. Cl.
USPC ............ 358/1.9; 358/515; 358/1.1; 358/504; 358/518; 313/112; 348/649; 348/675; 348/645; 348/727

(58) Field of Classification Search
USPC ............ 358/515, 1.1, 518, 1.9, 504; 345/589; 348/577, E9.04; 313/112, 461
See application file for complete search history.

(56) References Cited

U.S. PATENT DOCUMENTS

| | | | | |
|---|---|---|---|---|
| 5,418,575 A | * | 5/1995 | Kaneko et al. | 348/645 |
| 5,835,242 A | * | 11/1998 | Itoh | 358/515 |
| 5,999,230 A | * | 12/1999 | Tanabe | 348/649 |
| 6,134,022 A | * | 10/2000 | Yamamoto et al. | 358/1.9 |
| 6,404,509 B1 | * | 6/2002 | Kuwata et al. | 358/1.9 |
| 6,486,966 B1 | * | 11/2002 | Takahashi et al. | 358/1.1 |
| 6,965,191 B2 | * | 11/2005 | Koike et al. | 313/112 |
| 7,659,945 B2 | * | 2/2010 | Kim et al. | 348/675 |
| 8,169,388 B2 | * | 5/2012 | Galbraith et al. | 345/83 |
| 2003/0202192 A1 | * | 10/2003 | Kuwata et al. | 358/1.9 |
| 2007/0273939 A1 | * | 11/2007 | Kishida et al. | 358/504 |
| 2011/0187735 A1 | * | 8/2011 | Kondoh et al. | 345/589 |
| 2011/0199541 A1 | * | 8/2011 | Fujine et al. | 348/577 |

FOREIGN PATENT DOCUMENTS

| | | | | |
|---|---|---|---|---|
| JP | 2004-120012 | | 4/2004 | |
| JP | 2004120012 A | * | 4/2004 | H04N 1/46 |

* cited by examiner

*Primary Examiner* — Akwasi M Sarpong
(74) *Attorney, Agent, or Firm* — Amin, Turocy & Watson, LLP

(57) ABSTRACT

According to one embodiment, a color correction apparatus includes an input portion, a storing portion and a correction portion. The input portion inputs color image signals which correspond to recording color material amounts. The storing portion stores a standard color reproduction parameter for calculating a standard color reproduction chromaticity and reference chromaticity deviation amounts at a plurality of reference color points in recording color material amount coordinate space. The correction portion estimates chromaticity deviation amounts of the input color image signals on the basis of the reference chromaticity deviation amount, calculates a standard chromaticity which corresponds to the input color image signals on the basis of the standard color reproduction parameter and corrects the input color image signals on the basis of the estimated chromaticity deviation amounts and the standard chromaticity.

18 Claims, 17 Drawing Sheets

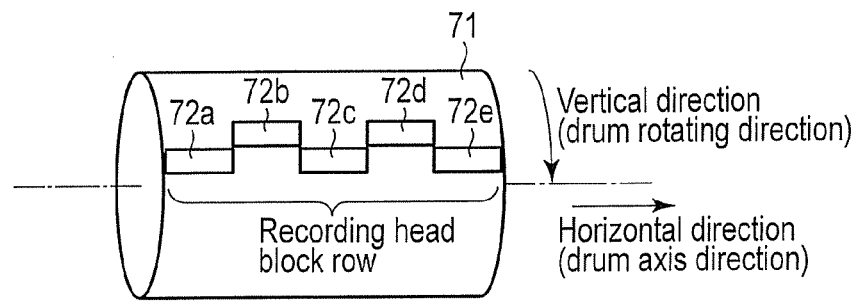
F I G. 1
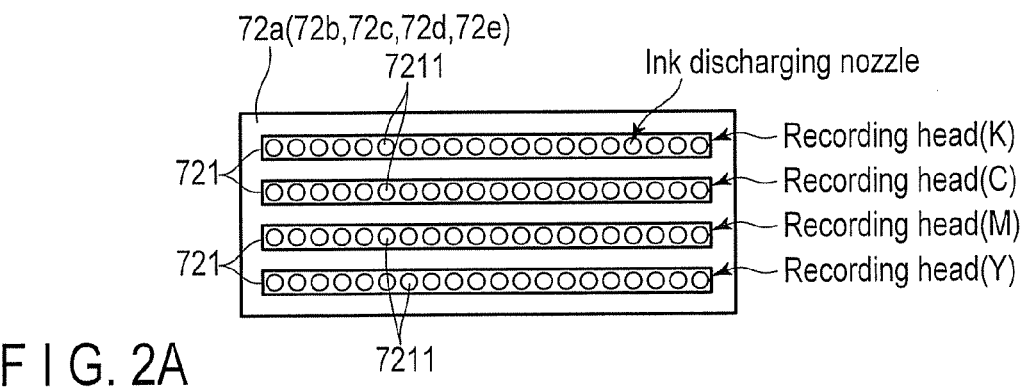
F I G. 2A
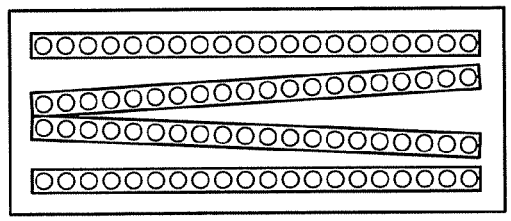
F I G. 2B
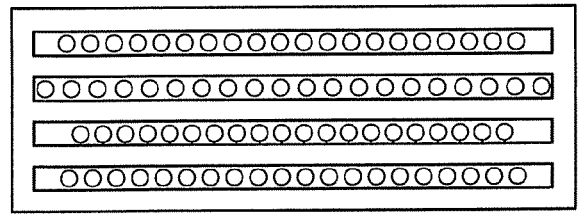
F I G. 2C

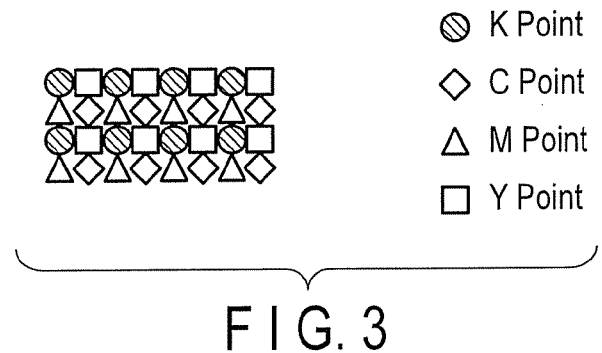
F I G. 3
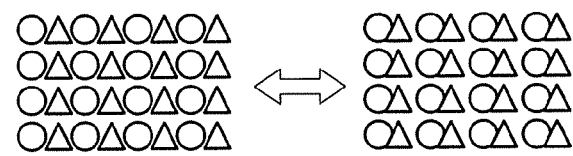
F I G. 4A
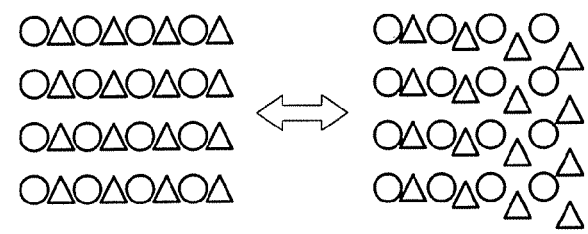
F I G. 4B

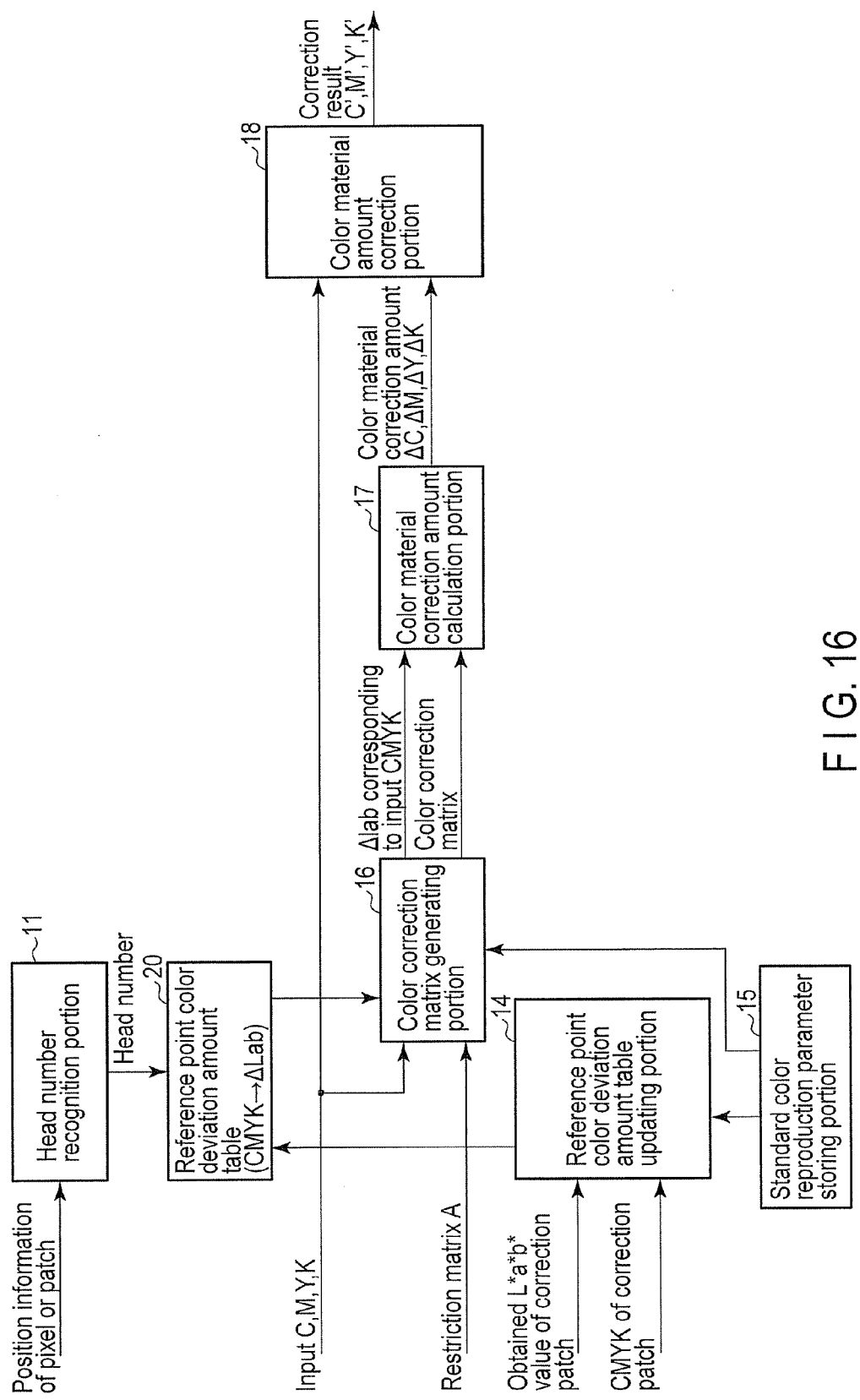
F I G. 16

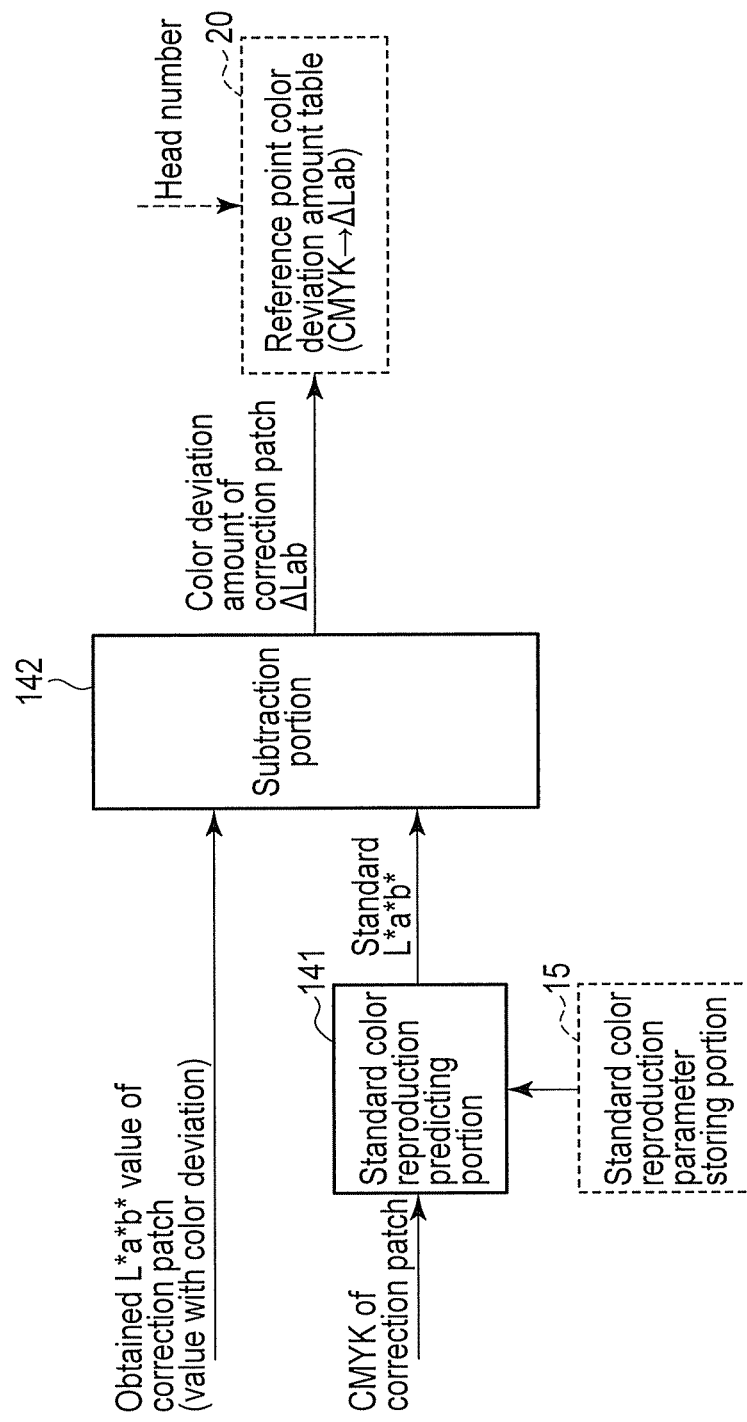
F I G. 18

US 8,824,006 B2

COLOR CORRECTION APPARATUS AND COLOR CORRECTION METHOD

CROSS-REFERENCE TO RELATED APPLICATIONS

This application is based upon and claims the benefit of priority from U.S. Provisional Applications No. 61/376,018, filed on Aug. 23, 2010; and No. 61/425,943, filed on Dec. 22, 2010; the entire contents of which are incorporated herein by reference.

FIELD

Embodiments described herein relate generally to a color correction apparatus and a color correction method.

BACKGROUND

A color recording apparatus that records an image by a line unit is widely known. For example, the color recording apparatus includes a plurality of recording head blocks (called an array head and a line head) that is disposed along the rotational direction of a drum, forms the image with respect to one paper sheet by a plurality of recording head blocks. In addition, each recording head block includes a plurality of recording heads (nozzle plates) which correspond to each color and each recording head includes a plurality of ink discharging ports (nozzles).

There are differences in the properties of each recording head block in the plurality of recording head blocks and thereby an unevenness in recording color occurs for each recording head block. In addition, due to differences in the properties (deviation of the nozzle installation location, deviation in the nozzle direction) for each nozzle caused by variations during assembly of the recording head blocks, even in a region assigned to identical recording head blocks, an unevenness in the recording color may occur. Therefore, the improvement of unevenness in these recording colors is desired.

For example, a method of correcting unevenness in the recording colors by switching a set of correction parameters for a recording head block unit is known.

BRIEF DESCRIPTION OF THE DRAWINGS

FIG. 1 is a diagram illustrating one example of a layout of a drum and a plurality of recording head blocks which constitute a color recording portion of a color ink jet recording apparatus according to each embodiment.

FIG. 2A is a diagram illustrating one example of the recording head blocks according to each embodiment.

FIG. 2B is a diagram for explaining one example of the variation between colors in the array direction of the nozzle in the recording head.

FIG. 2C is a diagram for explaining one example of the variation between the colors in the intervals of the nozzles in the recording head.

FIG. 3 is a diagram illustrating one example of a point position relationship for each color.

FIG. 4A is a diagram illustrating one example of the change of a recording color by printing position deviation.

FIG. 4B is a diagram illustrating one example of the change of a recording color by printing position deviation.

FIG. 16 is a diagram illustrating one example of the configuration of the correction processing portion according to the second embodiment.

FIG. 18 is a diagram for explaining one example of the process of the reference point color deviation amount table updating portion according to the second embodiment.

DETAILED DESCRIPTION

Figure 5:
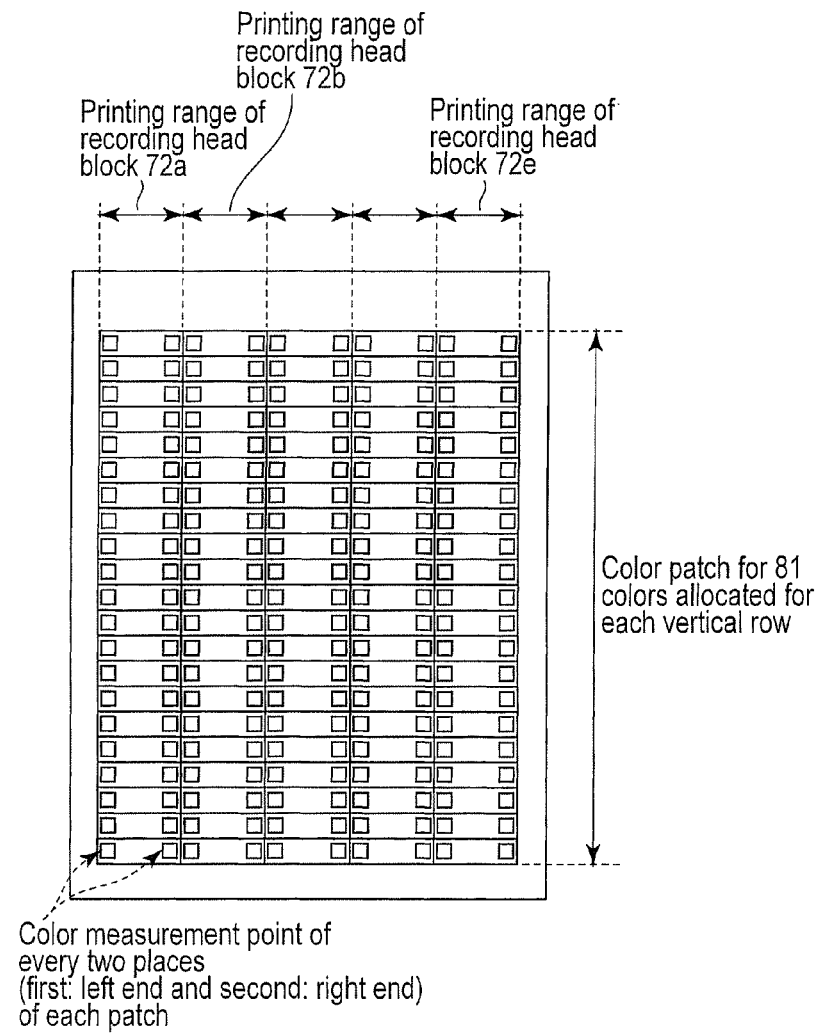
FIG. 5 is a diagram illustrating one example of a color patch according to a first embodiment.

In general, according to one embodiment, a color correction apparatus includes an input portion, a storing portion and a correction portion. The input portion inputs a color image signal which corresponds to a recording color material amounts. The storing portion stores a standard color reproduction parameter for calculating a standard color reproduction chromaticity and reference chromaticity deviation amounts at a plurality of reference color points in recording color material amount coordinate space. The correction portion estimates a chromaticity deviation amount of the input color image signal on the basis of the reference chromaticity deviation amount and calculates a standard chromaticity which corresponds to the input color image signal on the basis of the standard color reproduction parameter and corrects the input color image signal on the basis of the estimated chromaticity deviation amount and the standard chromaticity.

First Embodiment

An image forming apparatus (color correction apparatus) according to a first embodiment includes a plurality of recording head blocks and can execute color correction processing which corrects a difference in recording colors caused by the difference in the properties between the plurality of recording head blocks and the difference in the local properties in each recording head block.

For example, the image forming apparatus, on the basis of the color deviation amount of two end portions in a printing range using the same recording head blocks, estimates the color deviation amount of an arbitrary location in the range using the interpolation and calculates color material signal correction values which correspond to the estimated color deviation amount.

Hereinafter, the color correction processing by the image forming apparatus according to the first embodiment will be described.

$\Delta$Lab, described later, is represented by the Equation (1). In the same manner, $\Delta$CMY is represented by the Equation (2). In the same manner, $\Delta$CMYK is represented by the Equation (3). In the same manner, $\partial Lab/\partial CMYK$ is represented by the Equation (4). In the same manner, $\partial CMYK/\partial Lab$ is represented by the Equation (5).

$$\Delta Lab \text{ is matrix } \begin{bmatrix} \Delta L* \\ \Delta a* \\ \Delta b* \end{bmatrix} \quad (1)$$

$$\Delta CMY \text{ is matrix } \begin{bmatrix} \Delta C \\ \Delta M \\ \Delta Y \end{bmatrix} \quad (2)$$

$$\Delta CMYK \text{ is matrix } \begin{bmatrix} \Delta C \\ \Delta M \\ \Delta Y \\ \Delta K \end{bmatrix} \quad (3)$$

$\partial Lab/\partial CMYK$ is Jacobian matrix (4)

$$\begin{bmatrix} \partial L*/\partial C & \partial L*/\partial M & \partial L*/\partial Y & \partial L*/\partial K \\ \partial a*/\partial C & \partial a*/\partial M & \partial a*/\partial Y & \partial a*/\partial K \\ \partial b*/\partial C & \partial b*/\partial M & \partial b*/\partial Y & \partial b*/\partial K \end{bmatrix}$$

$\partial CMYK/\partial Lab$ is Jacobian matrix (5)

$$\begin{bmatrix} \partial C/\partial L* & \partial C/\partial a* & \partial C/\partial b* \\ \partial M/\partial L* & \partial M/\partial a* & \partial M/\partial b* \\ \partial Y/\partial L* & \partial Y/\partial a* & \partial Y/\partial b* \\ \partial K/\partial L* & \partial K/\partial a* & \partial K/\partial b* \end{bmatrix}$$

<Hardware Configuration>

Figure 8:
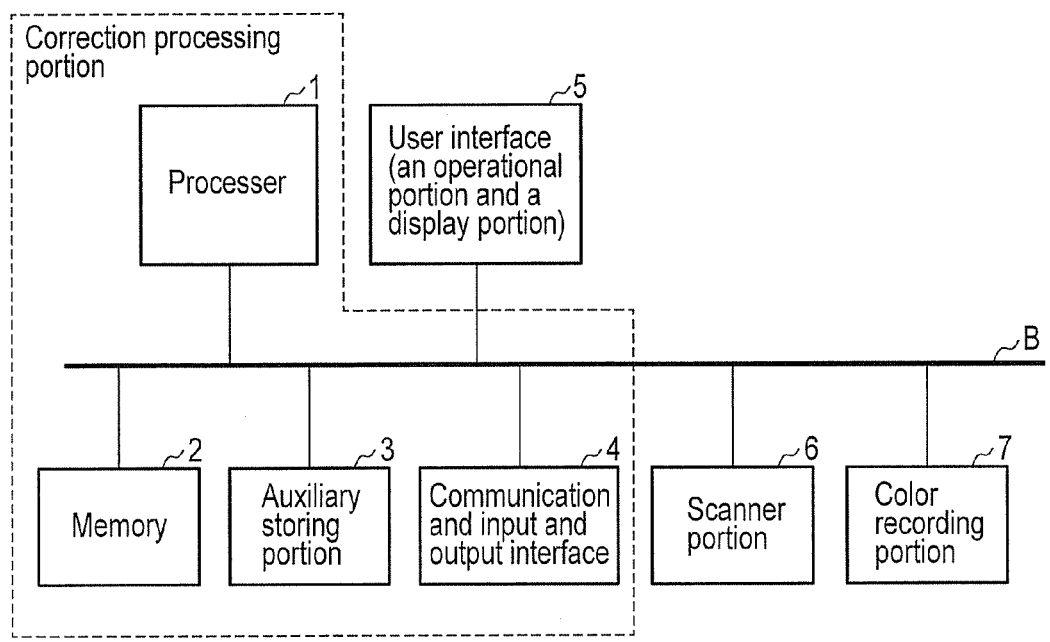
FIG. 8 is a diagram illustrating one example of an image forming apparatus (color correction apparatus) according to each embodiment.

FIG. 8 is diagram illustrating one example of a hardware configuration of the image forming apparatus (color correction apparatus) according to the first embodiment.

As shown in FIG. 8, the image forming apparatus includes a processor 1, a memory 2, an auxiliary storing portion 3, a communication and input and output interface 4, a user interface (operation portion and display portion) 5, a scanner portion 6 and a color recording portion 7. The processor 1, the memory 2, the auxiliary storing portion 3, the communication and input and output interface 4, the user interface (operation portion and display portion) 5, the scanner portion 6 and the color recording portion 7 are connected by data and a control signal bus.

The color correction processing according to the first embodiment can be realized by, for example, the processor 1, the memory 2, the auxiliary storing portion 3, the communication and input and output interface (I/F) 4. The processor 1 functions as the correction portion, at least any one of the memory 2 and the auxiliary storing portion 3 function as the storing portion, and input and output interface (I/F) 4 functions as the input portion.

Here, in the first embodiment, regarding the color correction processing according to the image forming apparatus which will be described; however, the color correction processing which will be described in the first embodiment can be realized by a different print server or the like from the image forming apparatus and can be further realized by a computer which provides the image data in which the color correction processing is to be processed.

<Outline of Color Recording Portion 7>

One example of the color correction processing by a color ink jet recording apparatus (image forming apparatus shown in FIG. 8) will be described.

FIG. 1 is a diagram illustrating one example of a layout of a drum 71 which constitutes a color recording portion 7 of a color ink jet recording apparatus and a plurality of recording head blocks.

As shown in FIG. 1, the color recording portion 7 includes the drum 71 which attaches and rotates a printing paper sheet, a recording head block row which faces the drum and a driving system of the drum, a paper sheet providing and discharging system and a signal processing system.

The recording head block row is configured so as to juxtapose a plurality of recording head blocks 72a, 72b, 72c, 72d and 72e in the lateral direction (in the axis direction of the drum). The recording head blocks 72a, 72b, 72c, 72d and 72e are disposed in a zigzag pattern in order to avoid overlapping of each end portion of each recording head block 72a, 72b, 72c, 72d and 72e.

As shown in FIG. 2A, each of the recording head blocks 72a, 72b, 73c, 72d, and 72e includes a plurality of the recording heads 721 that discharge inks of four CMYK colors respectively. Each recording head 721 is juxtaposed in the longitudinal direction (in the rotational direction of the drum).

In addition, each recording head 721 is configured by the array of a plurality of ink discharging nozzles 7211 that discharges each color ink. The color recording portion 7 controls the discharge amount of the ink from the ink discharging nozzles 7211 of each recording head 721 in response to the image signal (image signal value) while rotating the drum 71 to which the paper sheet is affixed. Therefore, the color recording portion 7 forms an image of gray distribution in response to the image signal on the paper sheet.

Herein, in the explanation, the recording head blocks 72a, 72b, 72c, 72d, and 72e configured of the recording heads 721 of four colors will be simply referred as a head.

In order to form a color image, the relative positions between respective heads 721 are set so that points of the four inks have a predetermined position relationship and a discharging timing of the ink from the ink discharging nozzles 7211 is set.

For example, as shown in FIG. 3, the four color inks are set so as to be discharged in different positions from each other. In color recording, even when the discharge amounts of the four color ink are identical, when the relative positions of each ink vary, the chromaticity of the recorded color also varies.

FIG. 4A is a diagram illustrating one example of each color deviation of two colors. The position to be printed between the ink colors relies on the accuracy of the affixed position of the heads and the accuracy of the array position of the recording heads 721 (nozzle plates), the accuracy of the array position of ink discharging nozzles 7211 and the variation in the discharge direction of the ink from the heads. For this reason, there are some cases where variation occurs in the relative printing positions of each ink for each recording head block and therefore, unevenness of the chromaticity may occur in each region for each recording head blocks.

In addition, there are also some cases where the variation occurs in the relative printing positions of each ink at the every local position in the head. In this case, the unevenness of the chromaticity may occur in the every local position in the head. It means cases, for example, as shown in FIG. 2B, when angles where nozzle plates of each color are installed are slightly shifted, when array intervals of the ink discharging nozzles 7211 in the head are shifted between the colors due to slight floating during the installation of the nozzle plates as shown in FIG. 2C (Both FIG. 2B and FIG. 2C are emphasis diagrams, and the actual variation when viewing the head is a fine amount not visible to the eye). FIG. 4B illustrates the change of recording colors assumed by the variation in the array direction of the ink discharging nozzles 7211 shown in FIG. 2B. These color change amounts in the heads are considered to have not random but specific regularity according to the location and the color variation amounts of an arbitrary location can be estimated from the estimated values of the variation amounts in representative points of several positions.

<Outline of Color Correction Processing>

By the color correction processing explained below, the color unevenness is corrected and it is possible to provide color recording that is stable and does not have the unevenness. The color correction processing according to the first embodiment calculates the color material signal correction value in an arbitrary position in an image (in a printing range of the head), for example, on the basis of the color variation amount of left and right end portions of the printing range in the same head in order to realize the superior color correction processing.

<Details of Color Correction Processing>

Figure 9:
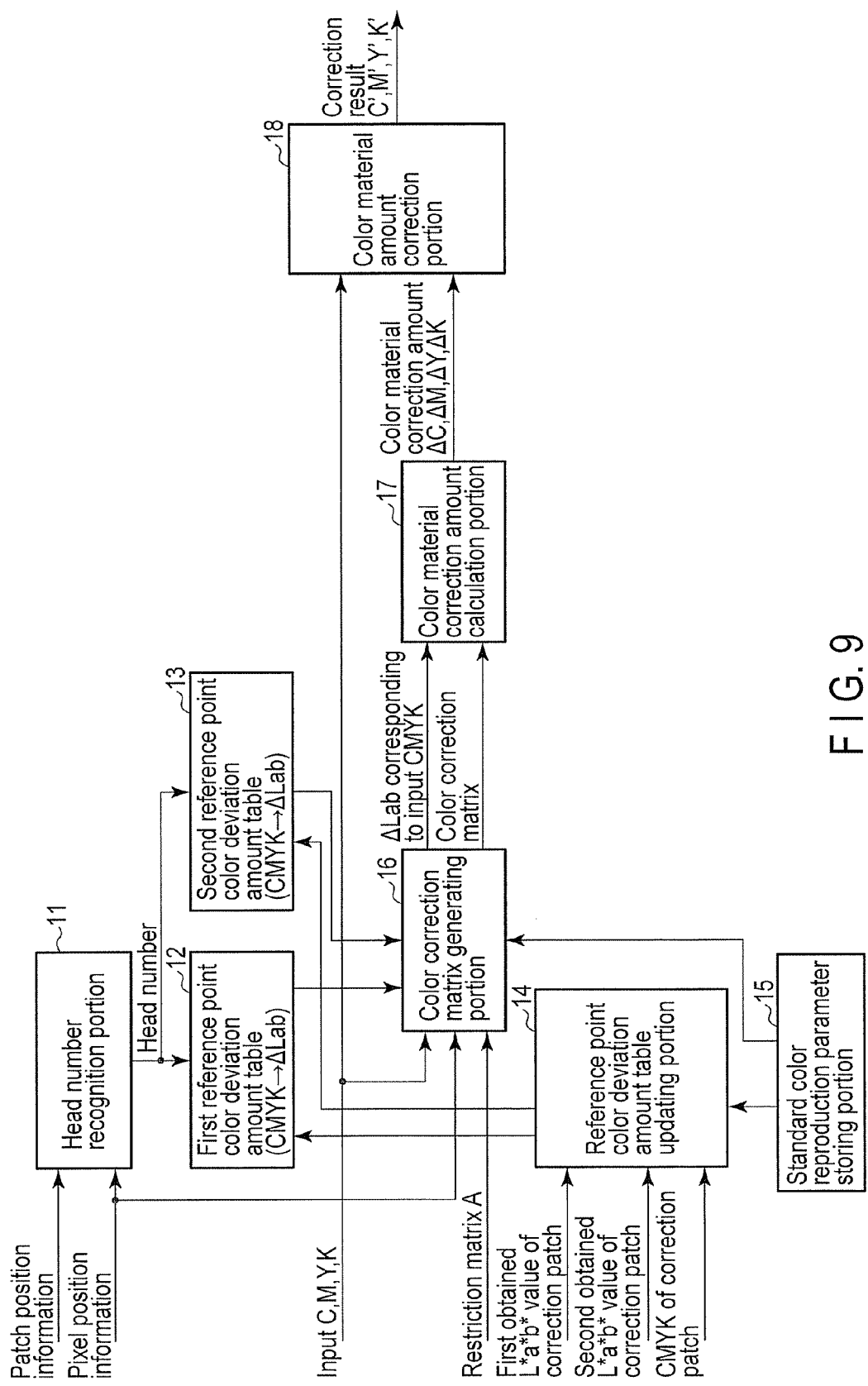
FIG. 9 is a diagram illustrating one example of a configuration of a correction processing portion according to the first embodiment.

As shown in FIG. 8, the correction processing portion is configured of the processor 1, the memory 2, the auxiliary storing portion 3, the communication and input and output interface 4 and the like. In addition, in order to explain the correction processing (software processing) by the correction processing portion easier, the correction processing portion may be considered to be configured as shown in FIG. 9. In other words, as shown in FIG. 9, the correction processing portion is configured of a head number recognition portion 11, a first reference point color deviation amount table 12, a second reference point color deviation amount table 13, a standard color reproduction parameter storing portion 15, a color correction matrix generating portion 16, a color material correction amount calculation portion 17, a color material amount correction portion 18 and a reference point color deviation amount table updating portion 14.

Figure 12:
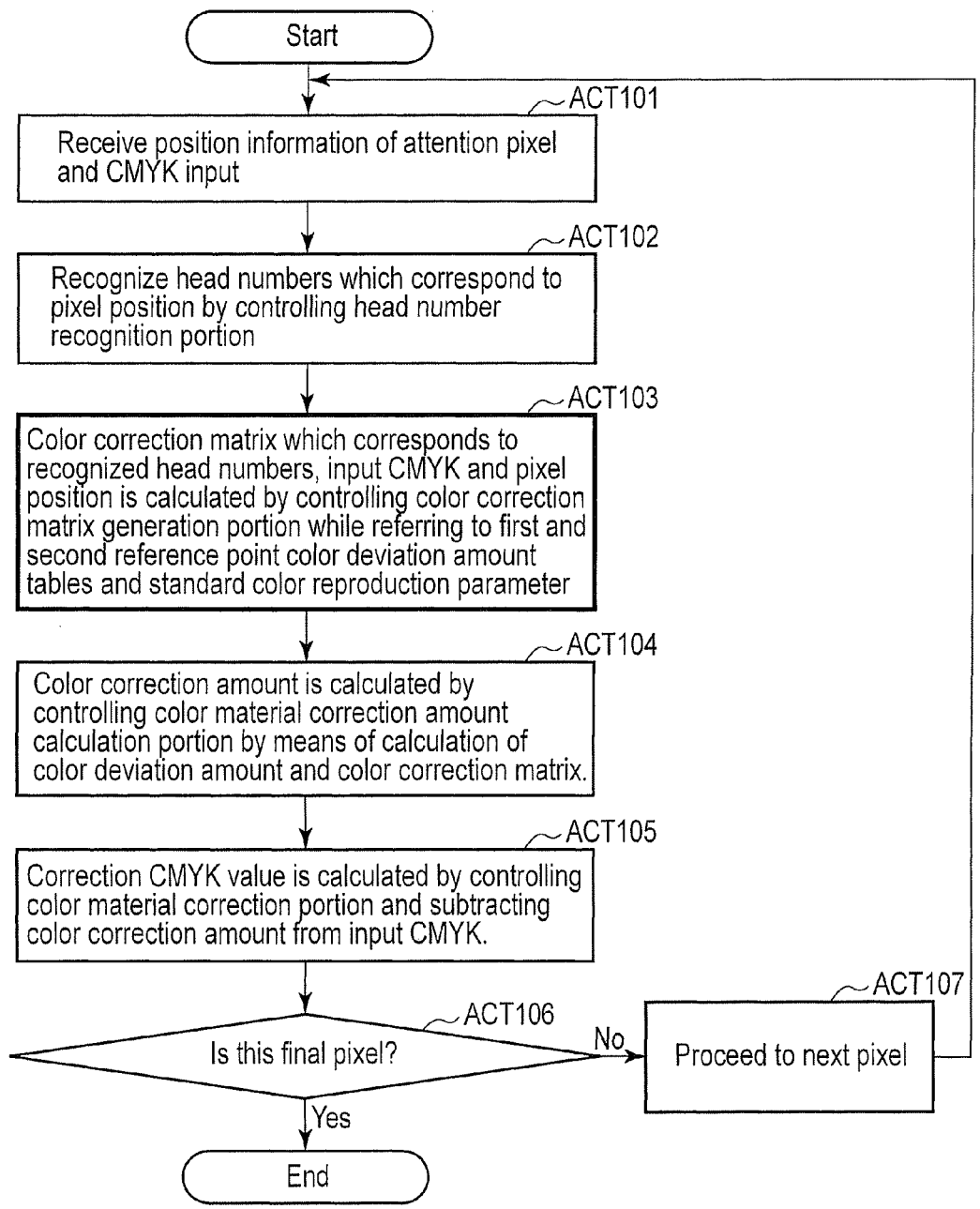
FIG. 12 is a flowchart of one example of a color unevenness correction process between the heads according to the first embodiment.

Next, the sequences and the calculation of the correction processing portion will be described. FIG. 12 is a flowchart illustrating one example of the correction processing. The processor 1 receives position information of attention pixels and CMYK input (ACT 101). Next, the processor 1 recognizes the head number which corresponds to the pixel position by controlling (by correction processing software) the head number recognition portion 11 (ACT 102). Next, the processor 1 calculates the color deviation amount ΔLab which corresponds to the recognized head numbers, the input CMYK and the position of the attention pixel by controlling the color correction matrix generating portion 16 (by the correction processing software) while referring to the first and second reference point color deviation amount tables.

Figure 6:
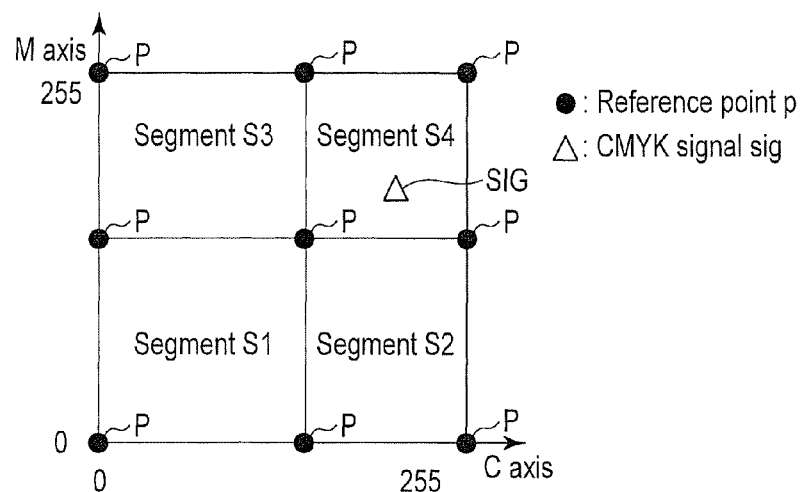
FIG. 6 is a diagram illustrating one example of CMYK color space.

Here, a calculation method of the color deviation amount ΔLab will be described in detail. First, the processor 1 calculates segment information S and a weight signal W by the input CMYK signals and the first reference point color deviation amount table. The processor 1 determines a segment by a plurality of reference points P which surround the input signal CMYK values so to be close to the input signal CMYK values. The segment is a partial space, segmented by the reference color in the CMYK color space. FIG. 6 is a diagram illustrating one example of the CMYK color space. In FIG. 6, for example, segments S1 to S4 which are included in the CMYK color space are shown. In addition, the CMYK color space is originally a four dimensional space; however, since the four dimensional space is difficult to be illustrated in the drawings, the CMYK color space of a two dimensional space is illustrated in FIG. 6 for the convenience of explanation. For example, an input CMYK signal SIG belongs to the segment S4. The segment information S that shows the four reference points P which surround the segment S4 and the weight signal $W_i$ that shows the four reference point contribution to the segment are output.

Next, the processor 1 outputs a reference point color deviation amount $\Delta Labi1$ with respect to a respective plurality of reference points P of the segment information S by the first reference point color deviation amount table 12 (refer to Equation (6)). The first reference point color deviation amount table 12 stores the color deviation amounts in the left end portion of the heads with respect to the CMYK values of the reference points P, that is, the difference from the colors which are stored in the standard head. Each color patch is recorded in each head in advance, the color measurement of the left end portion of the color patches is performed and the values which are calculated on the basis of the result thereof are stored. Next, the processor 1 calculates the first color deviation amount $\Delta Lab1$ by a color deviation amount calculation portion. In other words, the processor 1 calculates the sum of products of the color deviation amount in a plurality of reference points P output from the first reference point color deviation amount table 12 and the weight signal W of each reference point P. In practice, it is the calculation in the four dimensional space and a well-known four dimensional look-up table interpolation algorithm including the calculation method of the weight signal can be used.

$$\Delta Lab1 = \sum_i \Delta Lab_i 1 \cdot W_i \qquad (6)$$

In the same manner, the processor 1 calculates a second color deviation amount $\Delta Lab2$ while referring to the second reference point color deviation amount table 13 (refer to Equation (7)). The second reference point color deviation amount table 13 stores the color deviation amounts in the right end portions of the heads with respect to the CMYK values of the reference points P. It means that the color measurement in the right end portions of each color patch is performed and the values calculated on the basis of the result are stored.

$$\Delta Lab2 = \sum_i \Delta Lab_i 2 \cdot W_i \qquad (7)$$

The processor 1 calculates the color deviation amount ΔLab of the attention pixels of the input CMYK signals from the first color deviation amount ΔLab1 and the second color deviation amount ΔLab2 by Equation (8).

$$\Delta Lab = \Delta Lab1 \cdot (x2-c)/(x2-x1) + \Delta Lab2 \cdot (c-x1)/(x2-x1) \quad (8)$$

Here, x1, x2, and c respectively indicate values as below.

x1: coordinate in the lateral direction (in the axis direction of the drum) of the left and color measurement point of the head printing region x2: coordinate in the lateral direction (in the axis direction of the drum) of the right and color measurement point of the head printing region c: coordinate in the lateral direction (in the axis direction of the drum) of the input signal (the attention pixel)

The calculation Equation of the ΔLab represents a linear interpolation; however, in the first embodiment, other calculation methods (for example, a two dimensional non-linear interpolation or the like) than the above Equation can be used in accordance with the property of the color deviation.

Next, the processor 1 calculates a color correction matrix (ACT 103), which corresponds to the recognized head numbers, the input CMYK and the position of the attention pixels, by controlling the color correction matrix generating portion 16 (by correction processing software) and while referring the reference point color deviation amount table and a standard color reproduction parameter. The correction matrix is the Jacobian matrix that shows the relationship of the Lab deviation amount and the CMYK variation amount. Regarding the calculation method will be described in detail. First, the processor 1 obtains the value of ∂Lab/∂CMYK of the Jacobian matrix that shows the variation in the reproduction chromaticity Lab which corresponds to a slight variation of the CMYK. The processor 1 obtains the value of the Jacobian matrix a Lab/a CMYK by calculating the chromaticity Lab of the color recorded by changing the CMYK by very small amounts of ΔC, ΔM, ΔY, and ΔK from the CMYK and calculating the difference in chromaticities between the obtained and the recorded colors in the CMYK (#1). The Jacobian matrix is a matrix configured of four vectors ΔC, ΔM, ΔY, and ΔK shown in FIG. 7.

On the other hand, parameters Ac, Am, and Ay that show the relationship of the CMYK of each reference color are stored. The restriction relationship Equation (9) is represented as below.

$$\left.\begin{array}{l}\Delta K = Ac*\Delta C + Am*\Delta M + Ay*\Delta Y \\ \text{If restriction matrix } A \text{ is indicated as} \\ \text{restriction matrix } A = \begin{bmatrix} 1 & 0 & 0 \\ 0 & 1 & 0 \\ 0 & 0 & 1 \\ Ac & Am & Ay \end{bmatrix} \\ \text{the formulae below are satisfied,} \\ \Delta Lab = \partial Lab/\partial CMYK \cdot A \cdot \Delta CMY, \\ \Delta CMY = inv(\partial Lab/\partial CMYK \cdot A)\Delta Lab, \text{ and} \\ \Delta CMYK = A \cdot inv(\partial Lab/\partial CMYK \cdot A)\Delta Lab \\ \text{however, } inv(X) \text{ indicates the inverse matrix of matrix } X. \\ \text{In other words, the below Equation may be calculated.} \\ \partial CMYK/\partial Lab = A \cdot inv(\partial Lab/\partial CMYK \cdot A) \end{array}\right\} \quad (9)$$

Figure 10:
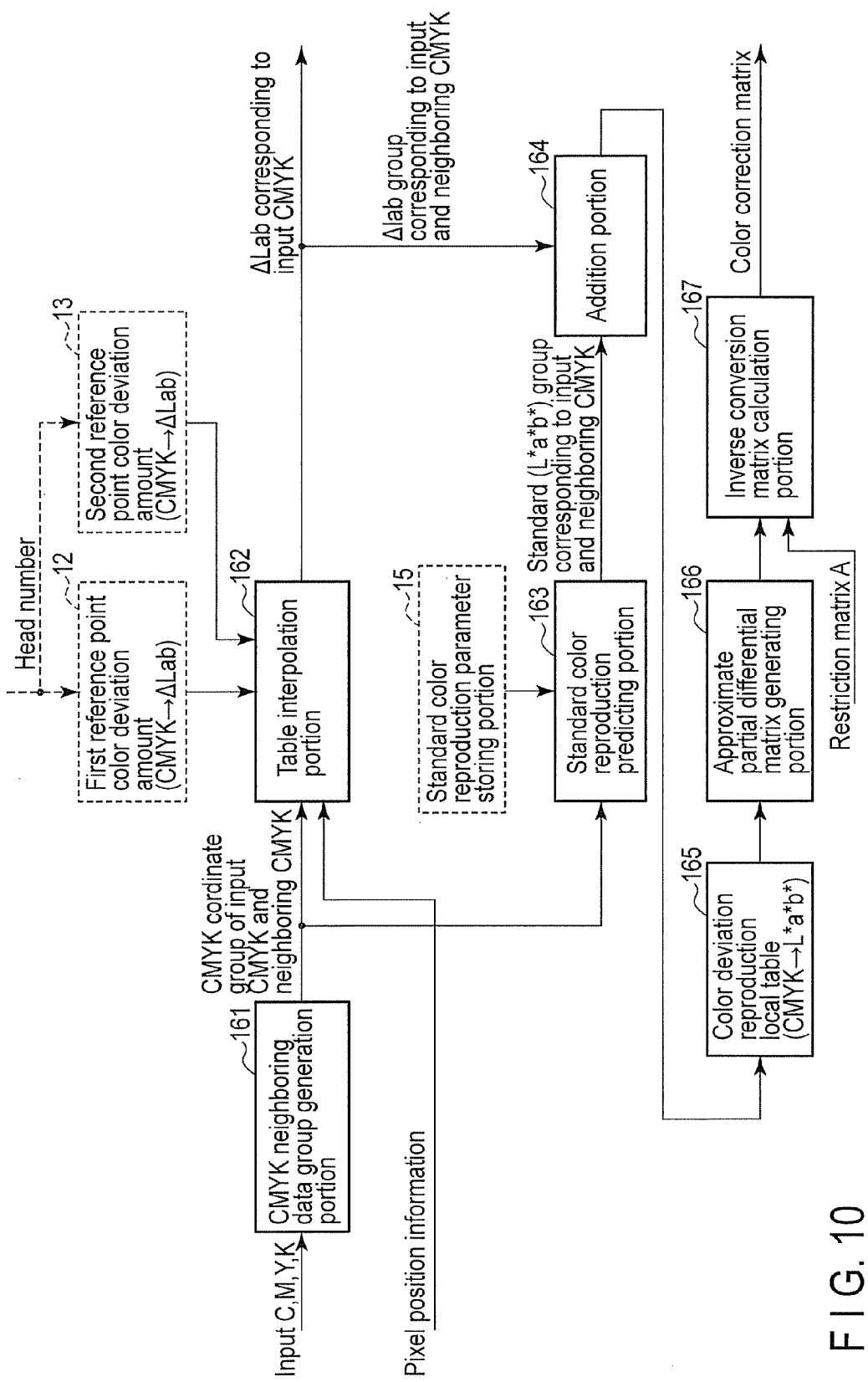
FIG. 10 is a diagram for explaining one example of a process by a color correction matrix generating portion according to the first embodiment.

FIG. 10 is a diagram illustrating one example of a configuration (data flow) of the color correction matrix generating portion 16. The color correction matrix generating portion 16 is configured of a CMYK neighboring data group generation portion 161, a table interpolation portion 162, a standard color reproduction predicting portion 163, a addition portion 164, a color deviation reproduction local table 165, an approximate partial differential matrix generating portion 166, and an inverse conversion matrix calculation portion 167.

Figure 13:
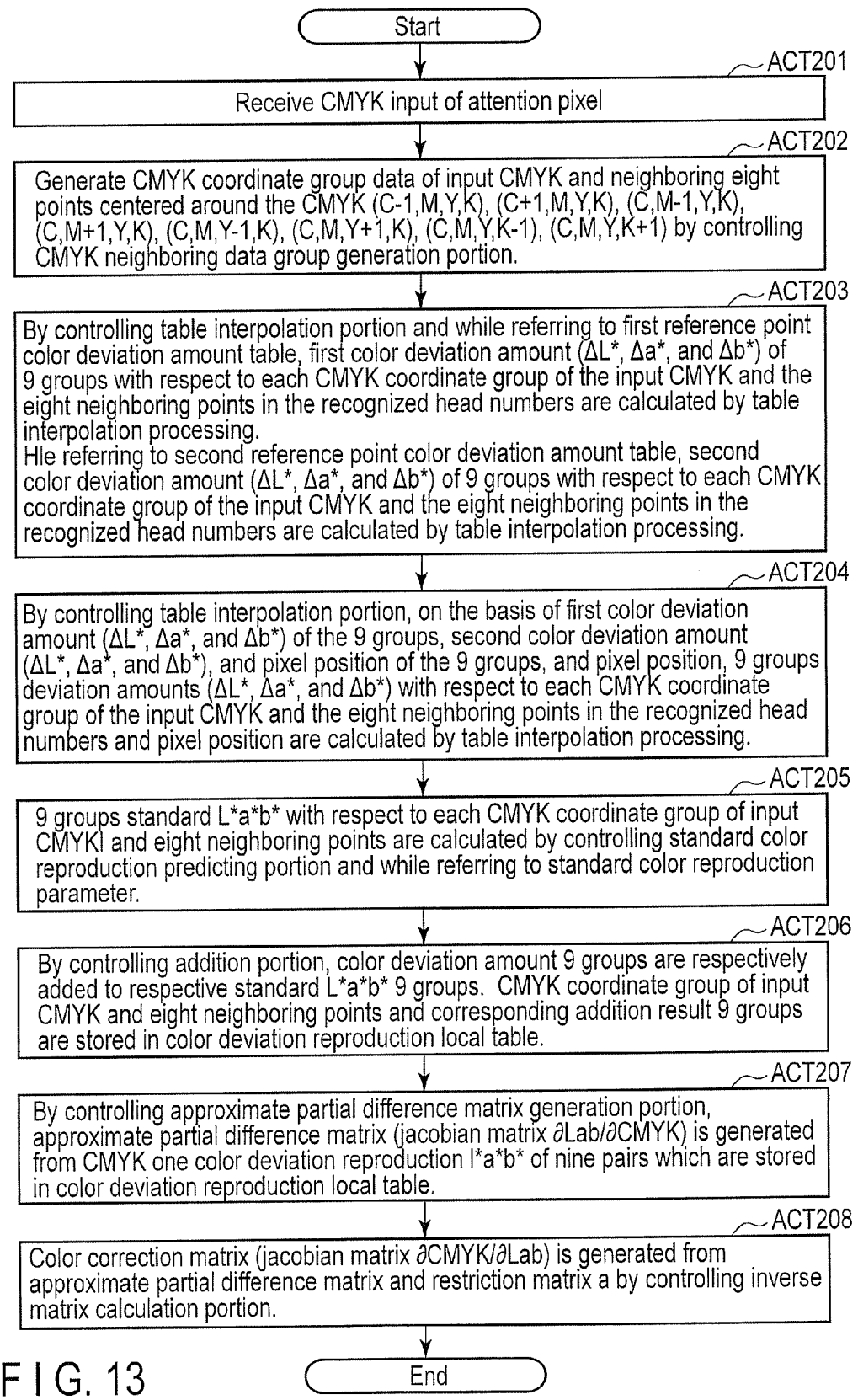
FIG. 13 is a flowchart of one example of the color correction matrix generating portion process according to the first embodiment.

Next, the sequence and the calculation of the color correction matrix generating portion 16 will be described in detail. FIG. 13 is a flowchart illustrating one example of the color correction matrix generating process.

The processor 1 receives the CMYK input of the attention pixels (ACT 201). Next, The processor 1 generates CMYK coordinate group data of the input CNYK and eight of neighboring points, which will be described as below, which have the input CMYK as the center, by controlling the CMYK neighboring data group generation portion 161 (by correction processing software) (ACT 202).

The eight of neighboring points are as below.
(C−1, M, Y, K)
(C+1, M, Y, K)
(C, M−1, Y, K)
(C, M+1, Y, K)
(C, M, Y−1, K)
(C, M, Y+1, K)
(C, M, Y, K−1)
(C, M, Y, K+1)

Next, the processor 1 calculates a group of 9 color deviation amounts with respect to each CMYK coordinate of the input CMYK and the eight neighboring points in the recognized head numbers and the position of the attention pixels by controlling the table interpolation portion 162 (by correction processing software) and while referring to the first and the second reference point color deviation amount tables 12 and 13 by the table interpolation processing (ACT 203). Next, the processor 1 calculates the 9 groups of standard L*a*b* with respect to each CMYK coordinate group of the eight neighboring points and the input CMYK by controlling the standard color reproduction predicting portion 163 (by correction processing software) and while referring to the standard color reproduction parameter (ACT 205). Next, the processor 1 adds the corresponding color deviation amount of the group 9 to each of the standard L*a*b*9 group by controlling the addition portion 164 (by correction processing software) (ACT 206). Next, the CMYK coordinate groups of the input CMYK and the eight neighboring points and the corresponding calculation result 9 groups are stored in the color deviation reproduction local table 165 (ACT 206). Next, the processor 1 approximately generates the partial differential matrix (Jacobian matrix ∂Lab/∂CMYK) from the color deviation of the color reproduction L*a*b* of one color of the CMYK of nine pairs stored in the color deviation reproduction local table 165 and by a method described in the #1 by controlling the approximate partial differential matrix generating portion 166 (ACT 207). Finally, the processor 1 generates the color correction matrix (Jacobian matrix ∂CMYK/∂Lab) for the existing attention pixels using Equation (10) from the approximate partial differential matrix and the restriction matrix A by controlling the inverse conversion matrix calculation portion 167 (by correction processing software) (ACT 208).

$$\partial CMYK/\partial Lab = A \cdot inv(\partial Lab/\partial CMYK \cdot A) \quad (10)$$

Next, the processor 1 calculates the color material correction amount ΔCMYK by the color deviation amount ΔLab and the Jacobian matrix ∂CMYK/∂Lab by controlling the color material correction amount calculation portion 17 (ACT 104). Specifically, the ΔLab may be multiplied to the Jacobian matrix ∂CMYK/∂Lab. The calculated ΔCMYK (Equation (11) below) represents the corrected amount to be subtracted from the CMYK signals in order to correct the variation of the reproduction chromaticity by the color deviation of the heads.

$$\Delta CMYK = \partial CMYK/\partial Lab \cdot \Delta Lab \quad (11)$$

Finally, the processor 1 calculates and outputs the correction CMYK signal (CMYK') (Equation (12) below) by subtracting the CMYK correction amount ΔCMYK from the input CMYK signals by controlling the color material amount correction portion 18 (by correction processing software).

$$CMYK' = CMYK - \Delta CMYK \quad (12)$$

Through the above series of the processes, the correction processing portion (color material correction portion 18) outputs the correction CMYK signals (CMYK') in which the influence of the color deviation of the head is corrected. The color recording portion 7 controls the discharge amount of the ink from ink discharging nozzles 7211 of each recording head 721 on the basis of the correction CMYK signals (CMYK'). Therefore, the color variation between the heads is corrected.

Sequentially, when pixels to be corrected remain, the processing proceeds to next pixel and the process described above is repeated.

<Description of Obtaining Processing of Color Deviation Amount>

Figure 11:
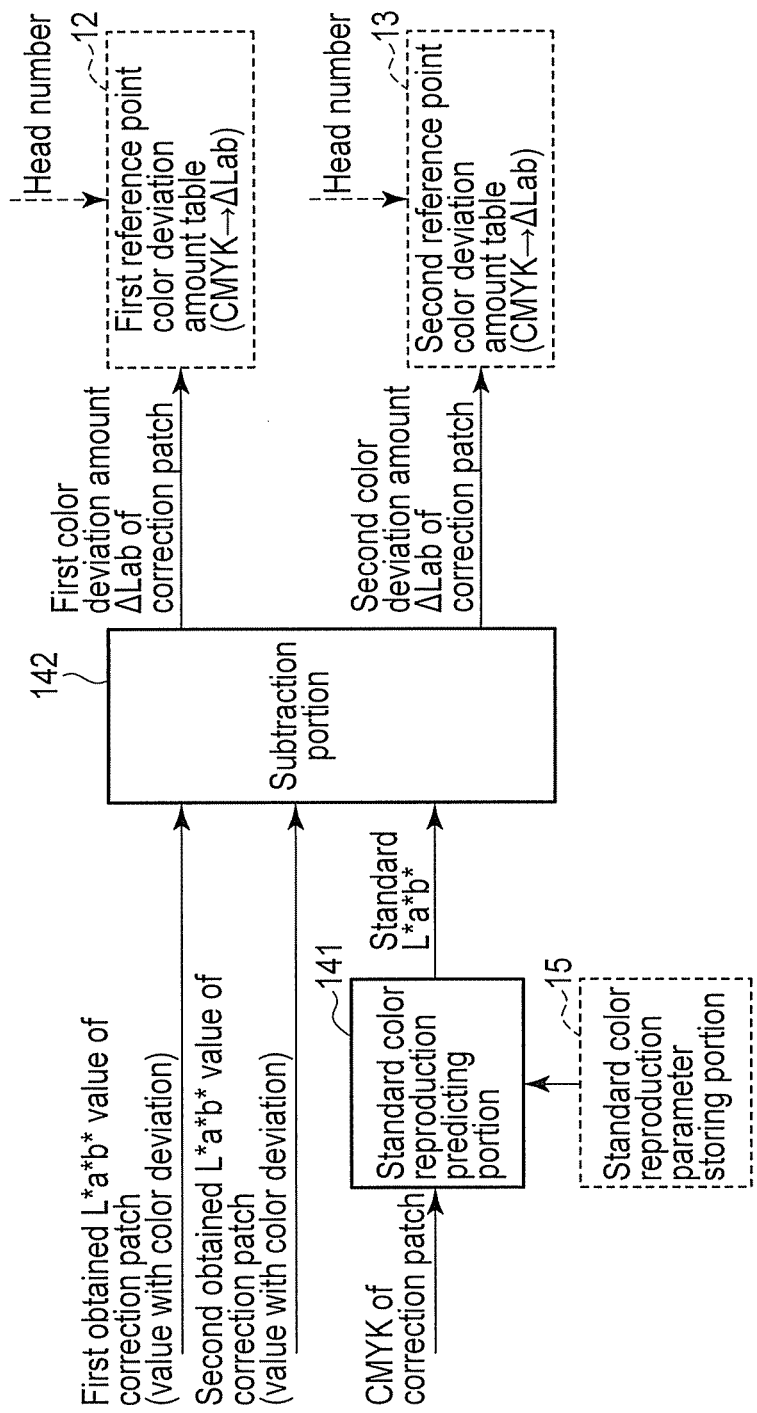
FIG. 11 is a diagram for explaining one example of a process by a reference point color deviation amount table updating portion according to the first embodiment.

FIG. 11 is a diagram illustrating one example of a configuration (data flow) of the reference point color deviation amount table updating portion 14 according to the first embodiment. The reference point color deviation amount table updating portion 14 is configured of the standard color reproduction predicting portion 141 and the subtraction portion 142.

Figure 14:
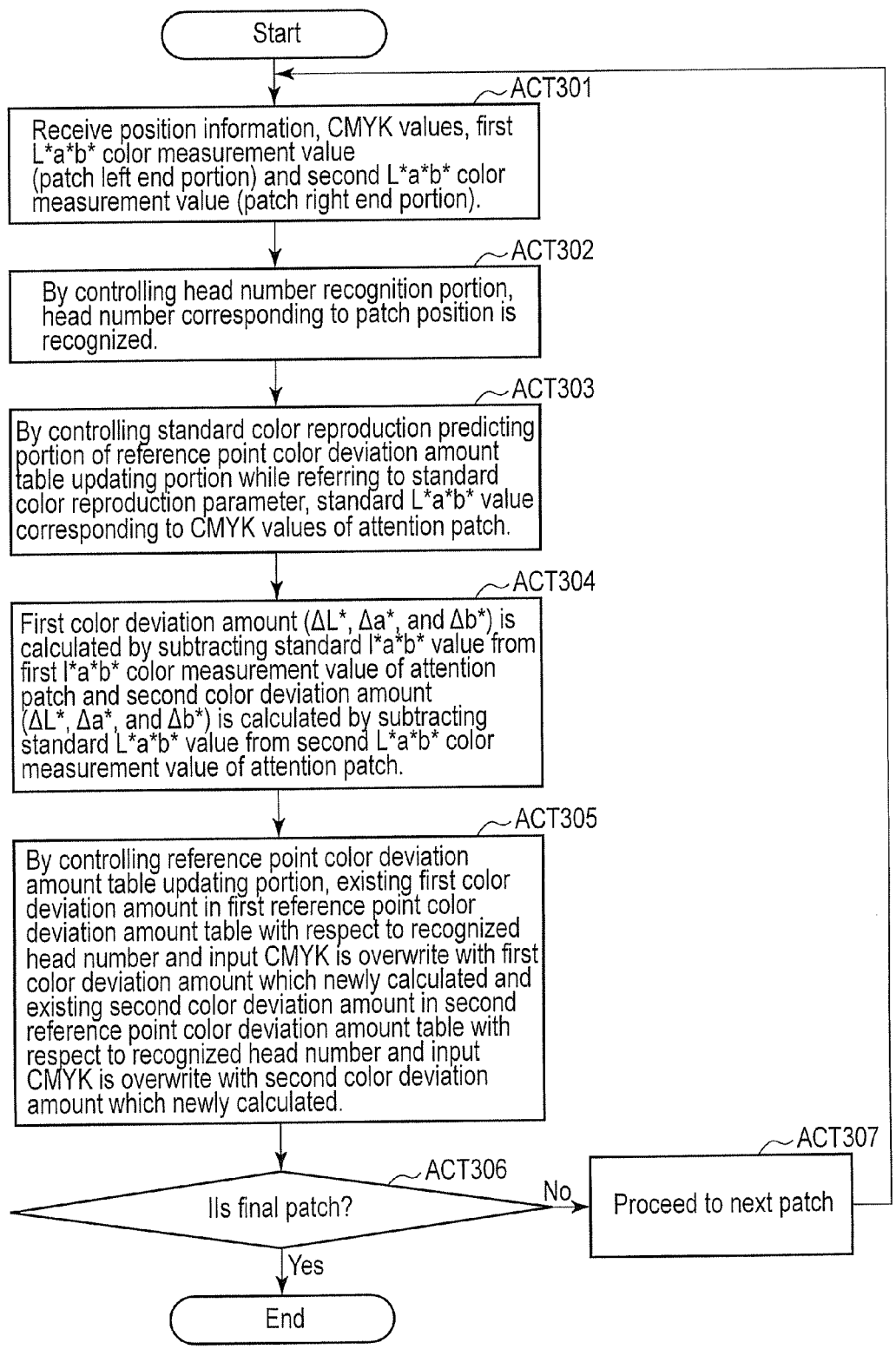
FIG. 14 is a flowchart of one example of a reference point color deviation amount table updating process according to the first embodiment.

Next, the sequence and the calculation of the reference point color deviation amount table updating portion 14 will be described. The processor 1 can update the reference point color deviation amount table at each time of the image processing or the reference point color deviation amount table can be updated whenever necessary. FIG. 14 is a flowchart illustrating one example of the reference point color deviation amount table update processing. The processor 1 collects the first chromaticity L*a*b* measurement values and the second chromaticity L*a*b* measurement values of each color patch of the color patch chart for colors to be measured in order to measure the reference point color deviation amounts, printed by controlling the color recording portion 7 in advance through the communication and input and output interface 4 and the values are stored in the memory 2 or the auxiliary storing portion 3. FIG. 5 is a diagram illustrating one example of the color patch chart for the colors to be measured. In the color patch chart, the color patch group which corresponds to the CMYK data group of the reference points P is printed in a region on the paper sheet allocated to each head block. In an example in FIG. 5, the printing regions of the five recording head blocks are disposed so as to be equally divided the whole printing region into five sections in the horizontal direction. The color patches are disposed in the longitudinal direction by the numbers of the reference points P of the CMYK space in each region. For example, when the positions of the reference points P have three points in each CMYK direction as shown in FIG. 6, the amounts of $3^4$=81 color are vertically disposed. In the first embodiment, as shown in FIG. 5, the first chromaticity L*a*b* measurement value is the color measurement value of the left end portions of each color patch and the second chromaticity L*a*b* measurement value is the color measurement values of the right end portions of each color patch. As the places of the color measurement of each patch, two places of the left and right end portions of the first embodiment are not always necessary;

however, by preparing the left and right end portions, there are advantages in that the deformation (level difference) of the color reproduction in the boundary between the heads can be suppressed by maintaining the calculation accuracy of the color deviation amounts with respect to the pixel near the boundary and further by maintaining the accuracy of the color correction near the boundary since the boundary of the adjacent head of the printing regions of each head becomes closer to the color measurement places.

Next, the processor 1 receives the position information of the attention color patch, the CMYK values and the stored first and the second L*a*b* measurement values (ACT 301). Next, the processor 1 recognizes the head numbers which correspond to the patch position information by controlling the head number recognition portion 11 (by correction processing software) (ACT 302). Next, the processor 1 obtains the standard L*a*b* value with respect to the CMYK value of the attention patch by controlling the standard color reproduction predicting portion 143 of the reference point color deviation amount table updating portion 14 (by correction processing software) while referring to the standard color reproduction parameter (ACT 303). Next, the processor 1 calculates a first color deviation amount ΔLab by controlling the subtraction portion 142 of the reference point color deviation amount table updating portion 14 (by correction processing software) and subtracting the standard L*a*b* value from the first L*a*b* color measurement value of the attention patch (ACT 304). In the same manner, the second color deviation amount ΔLab is calculated by subtracting the standard L*a*b* value from the second L*a*b* color measurement value of the attention patch (ACT 304). Finally, the processor 1 overwrites the existing color deviation amounts in the first and the second reference point color deviation amount table which correspond to the recognized head numbers and the input CMYK with the newly calculated first and the second color deviation amounts, by controlling the reference point color deviation amount table updating portion 14 (by correction processing software) (ACT 305).

Sequentially, when unprocessed color patches remain, the processor 1 proceeds to the next patch and the processing described above repeated.

According to the color correction processing of first embodiment described above, it is possible to correct the deviation of the chromaticity of the recording images caused by the deviation of the printing positions between the heads and in the heads.

Hereinafter, the configuration of the image forming apparatus according to the first embodiment will be summarized.

The image forming apparatus according to the first embodiment includes portion for inputting the color image signals which correspond to the recording color material amounts; chromaticity deviation amount storing portion for storing chromaticity deviation amount data of at least of two places in printing ranges of the same head blocks in each reference color point as the chromaticity deviation amount in a plurality of reference color points in recording color material amount coordinate space; chromaticity deviation amount calculation portion for calculating the chromaticity deviation amount signals with respect to the input color image signals, by reading the chromaticity deviation amounts from the chromaticity deviation amount storing portion and by using the read chromaticity deviation amounts, the input color image signals and the pixel position information of the input color image signals on the basis of the input color image signal values; standard color reproduction parameter storing portion for storing a parameter (standard color reproduction parameter) for calculating the standard color reproduction chromaticity (standard chromaticity) which corresponds to the color image signals which correspond to the recording color material amounts; standard chromaticity calculation portion for calculating the standard chromaticity which corresponds to the input color image signal values using the standard color reproduction parameter, stored in the standard color reproduction parameter storing portion; reproduction chromaticity calculation portion for calculating the reproduction chromaticity which corresponds to the input color image signal values on the basis of the chromaticity deviation amounts which corresponds to the standard chromaticity and the input color image signals; matrix calculation portion for calculating the matrix showing the relationship of the chromaticity change amounts and the color material correction amounts in the adjacent region in the recording color material amount coordinate space of the input color image signals using the calculated reproduction chromaticity and the input color image signals; color material correction amount calculation portion for calculating the color material correction amounts with respect to the input color image signals from the chromaticity deviation amounts and the matrix with respect to the input color image signals; and color material amount correction portion for calculating the corrected color image signals from the input color image signal and the color material correction amount.

Second Embodiment

The image forming apparatus (color correction apparatus) according to a second embodiment includes a plurality of recording head blocks and furthermore, the apparatus can execute the color correction processing which corrects the difference in the recording colors caused by the properties between a plurality of the recording head blocks.

For example, the image forming apparatus calculates Jacobian matrix ($\partial CMYK/\partial Lab$) used in calculating the corrected amounts of the CMYK signals in accordance with arbitrary CMYK input values (values to be corrected) on the basis of the chromaticity change near the input values in the CMYK space.

Hereinafter, the color correction processing according to the image forming apparatus of the second embodiment will be described. Here, the same explanation as the color correction processing according to the image forming apparatus of the first embodiment is omitted. For example, FIG. 1, FIG. 2A, FIG. 3, FIG. 4A, FIG. 6 to FIG. 8 and Equation (1) to Equation (5) are commonly described in the first and the second embodiments. Therefore the explanation of these drawings and Equations of the second embodiment is omitted.

<Outline of Color Correction Processing>

By the color correction processing which will be described, the color unevenness is corrected and it is possible to provide color recording that is stable, and does not have the color unevenness.

The color correction processing according to the second embodiment can be realized in a relatively smaller scale from the viewpoint below.

1. The chromaticity deviation amount of an arbitrary point is obtained from the chromaticity deviation amounts of a limited number of reference points. In other words, the chromaticity deviation amount of arbitrary points is estimated from the chromaticity deviation amounts of the reference point.

2. The CMYK corrected amount is calculated from the color deviation amount using the Jacobian matrix.

Hereinafter, regarding 1 and 2 will be described.

In the second embodiment, the chromaticity deviation of each recording head 721 by the relative deviation of the printing position between the ink colors is estimated in advance. The image signal is an 8-bit signal for CMYK respectively, total combined color signal becomes 32nd power of 2; therefore, the color measurement of the deviation amount is too much workload to be realized. Meanwhile, when the image signal value is in the median value, the deviation of the chromaticity is remarkable, and when the value is 0 or 255, since the ink point is substantially constant, the deviation of the chromaticity becomes 0 or extremely small. For this reason, several reference points where the image signal value of CMYK (CMYK signal value) becomes the median value are determined and the color deviation amounts of the reference points are estimated in advance. The color deviation amounts of the signals (signals shifted from the reference points) except for the reference points are estimated by the interpolation from the values of the reference points (two or more reference points). However, for the convenience for the calculation of the interpolation, the reference points are disposed even on the outer most surface (on the surface where any one of C, M, Y, and K becomes 0 or 1) in the color signal space.

Next, the correction (increase and decrease) amount of the CMYK signal value is calculated using the Jacobian matrix for correcting color deviation $\Delta Lab$ by the color deviation $\Delta Lab$ calculated by the explanation described above. The Jacobian matrix is a matrix that shows a relationship of the fine change of the CMYK signal value and the fine change of the Lab chromaticity value. The changed amount (this may be measured) of the chromaticity Lab of the reproduction color with respect to the fine change of the CMYK signal value is calculated and a inverse matrix is calculated, thereby the correction amount can be easily obtained. However, since the Lab is three dimensional with respect to the CMYK signal existing in the four dimensional space, it is necessary to determine the restriction conditions between the CMYK and use the restriction conditions in the inverse matrix calculation.

<Detailed Explanation of Color Correction Processing>

As shown in FIG. 8, the correction processing portion is configured of the processor 1, the memory 2, the auxiliary storing portion 3, the communication and input and output interface 4 and the like. In addition, in order to easily explain the correction processing (software processing) by the correction processing portion, the correction processing portion is configured as shown in FIG. 16. That is, as shown in FIG. 16, the correction processing portion is configured of a head number recognition portion 11, a reference point color deviation amount table 20, a standard color reproduction parameter storing portion 15, the color correction matrix generating portion 16, a color material correction amount calculation portion 17, a color material amount correction portion 18, a reference point color deviation amount table updating portion 14.

Figure 19:
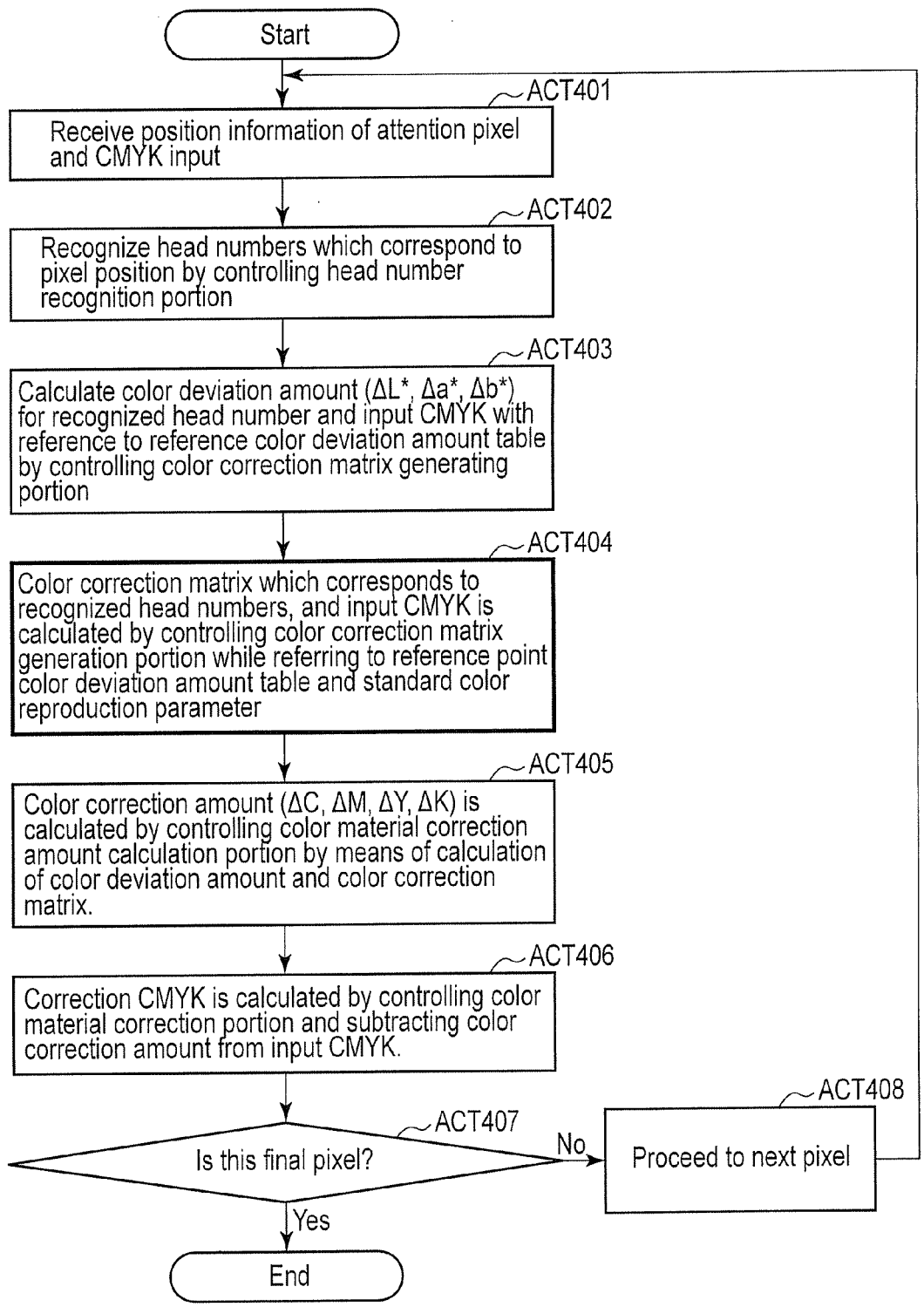
FIG. 19 is a flowchart illustrating one example of the color unevenness correction process between heads according to the second embodiment.

Next, the sequence and the calculation of the correction processing portion will be described in detail. FIG. 19 is a flowchart illustrating one example of the correction processing. The processor 1 receives the position information of the attention pixels and the CMYK input (ACT 401). Next, the processor 1 recognizes the head numbers which correspond to the pixel position by controlling the head number recognition portion 11 (by correction processing software) (ACT 402). Next, the processor 1 calculates the color deviation amount $\Delta Lab$ which correspond to the recognized head number and the input CMYK by controlling the color correction matrix generating portion 16 (by correction processing software) while referring to the reference point color deviation amount table (ACT 403).

Here, the calculation method for the color deviation amount ΔLab will be described in detail. First, the processor 1 calculates segment information S and weight signal W by the input CMYK signals and a predetermined reference chromaticity table. The processor 1 determines the segment by the table of a plurality of reference points P surrounding the input signal CMYK values so as to close to the input signal CMYK values. The segment is the partial space, segmented by the reference color in the CMYK color space. FIG. 6 is a diagram illustrating one example of the CMYK color space. In FIG. 6, for example, segments S1 to S4 which are included in the CMYK color space are shown. In addition, the CMYK color space is originally a four dimensional space; however, since the four dimensional space is difficult to be illustrated in the drawings, the CMYK color space of a two dimensional space is illustrated in FIG. 6 for the convenience of explanation. For example, an input CMYK signal SIG belongs to the segment S4. The segment information S that shows the four reference points P which surround the segment S4 and the weight signal $W_i$ that shows the four reference point contribution to the segment are output.

Next, the processor 1 outputs the reference point color deviation amount $\Delta Lab_i$ with respect to respective a plurality of reference points P of the segment information S by the reference point color deviation amount table 20 (Equation (13)). As for the reference point color deviation amount table, with respect to the CMYK values of the reference points P, the color deviation amounts of the heads, that is, the difference from the colors of the standard head is stored. The recording and the color measurement of the color patch in each head are performed in advance such that the result thereof is stored with the calculated value.

Next, the color deviation amount ΔLab is calculated by the color deviation amount calculation portion. In other words, the sum of products of the color deviation amount in a plurality of reference points output from the reference point color deviation amount table and the weight signal W of each reference point P.

Δ Lab shows an estimated value of the color deviation amount in pixels of the input CMYK signal. Δ Lab is expressed by Equation (13) as below.

$$\Delta Lab = \sum_i \Delta Lab_i \cdot W_i \qquad (13)$$

Figure 7:
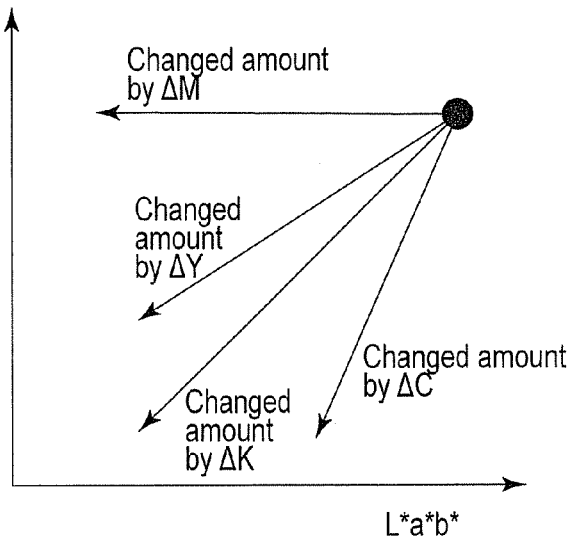
FIG. 7 is a diagram for explaining a Jacobian matrix which is configured by four vectors ΔC, ΔM, ΔY and ΔK.

Next, the processor 1 calculates the color correction matrix which corresponds to the recognized head number and the input CMYK by controlling the color correction matrix generating portion 16 (by correction processing software) while referring to the reference point color deviation amount table and the standard color reproduction parameter. The correction matrix is the Jacobian matrix illustrating the relationship of the Lab deviation amounts and the change amounts of the CMYK. The calculation method will be described in detail. First, the processor 1 obtains the value of the Jacobian matrix ∂Lab/∂CMYK which shows the variation of the reproduction chromaticity Lab which corresponds to the slight variation of the CMYK. The processor 1 calculates the difference in the chromaticity Lab of the colors recorded by varying the CMYK by the slight amounts ΔC, ΔM, ΔY, and ΔK respectively from the CMYK and the chromaticity of the colors recorded in the CMYK (#2). The Jacobian matrix is the matrix configured of four vectors ΔC, ΔM, ΔY, and ΔK as shown in FIG. 7.

On the other hand, Parameters Ac, Am, and Ay that show the relationship of the CMYK of each reference point are stored. The restriction relationship Equation (14) is as below.

$$\left. \begin{array}{l} \Delta K = Ac * \Delta C + Am * \Delta M + Ay * \Delta Y \\ \text{If restriction matrix } A \text{ is indicated as} \\ \text{restriction matrix } A = \begin{bmatrix} 1 & 0 & 0 \\ 0 & 1 & 0 \\ 0 & 0 & 1 \\ Ac & Am & Ay \end{bmatrix} \\ \text{the below formulae are satisfied,} \\ \Delta Lab = \partial Lab/\partial CMYK \cdot A \cdot \Delta CMY, \\ \Delta CMY = inv(\partial Lab/\partial CMYK \cdot A) \Delta Lab, \text{ and} \\ \Delta CMYK = A \cdot inv(\partial Lab/\partial CMYK \cdot A) \Delta Lab \\ \text{however, } inv(X) \text{ indicates the} \\ \text{inverse matrix of matrix } X. \\ \partial CMYK/\partial Lab = A \cdot inv(\partial Lab/\partial CMYK \cdot A) \end{array} \right\} \qquad (14)$$

Figure 17:
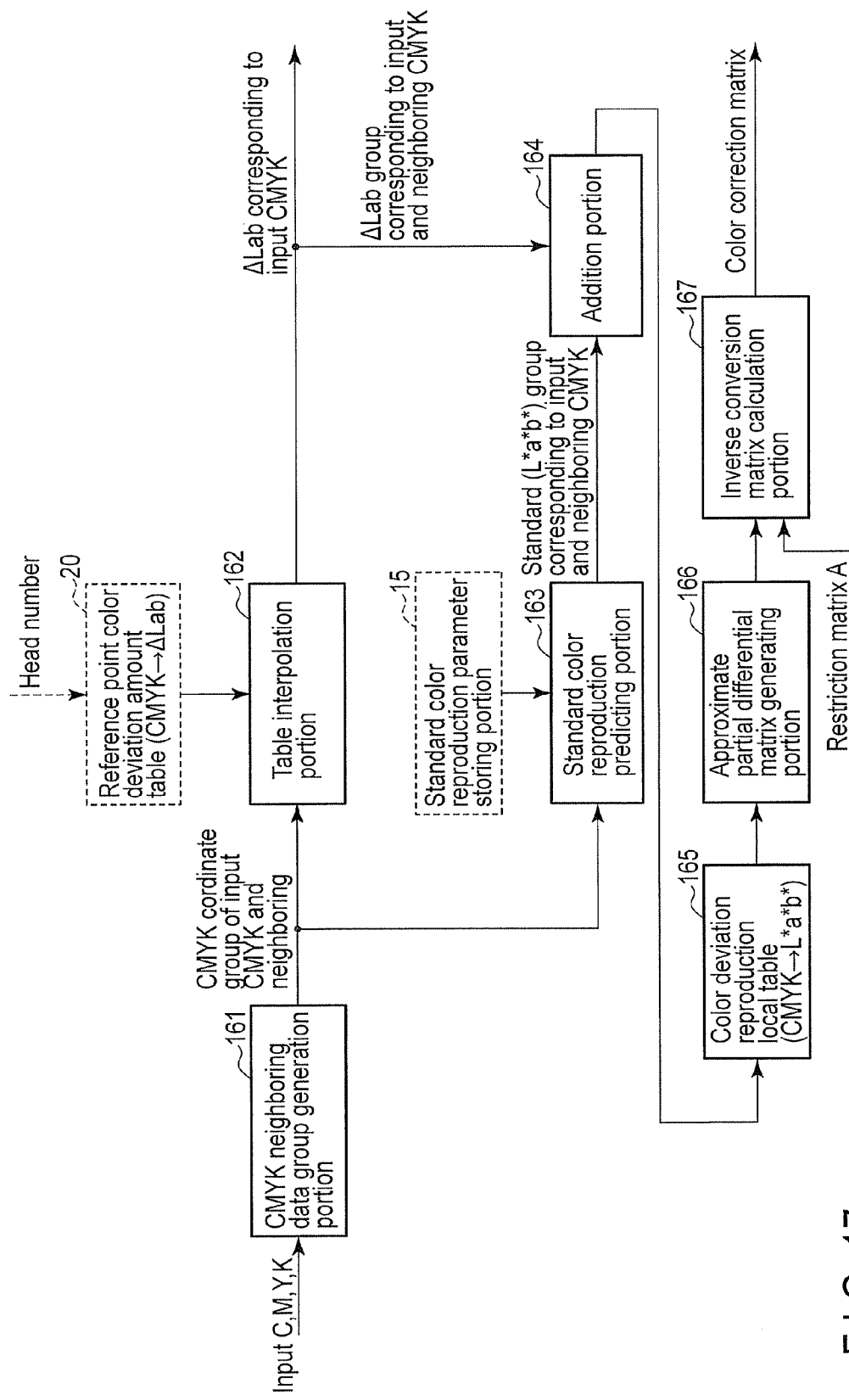
FIG. 17 is a diagram for explaining one example of the process by the color correction matrix generating portion according to the second embodiment.

FIG. 17 is a diagram illustrating one example of a configuration (data flow) of the color correction matrix generating portion 16. The color correction matrix generating portion 16 is configured of a CMYK neighboring data group generation portion 161, a table interpolation portion 162, a standard color reproduction predicting portion 163, an addition portion 164, a color deviation reproduction local table 165, an approximate partial differential matrix generating portion 166 and an inverse conversion matrix calculation portion 167.

Figure 20:
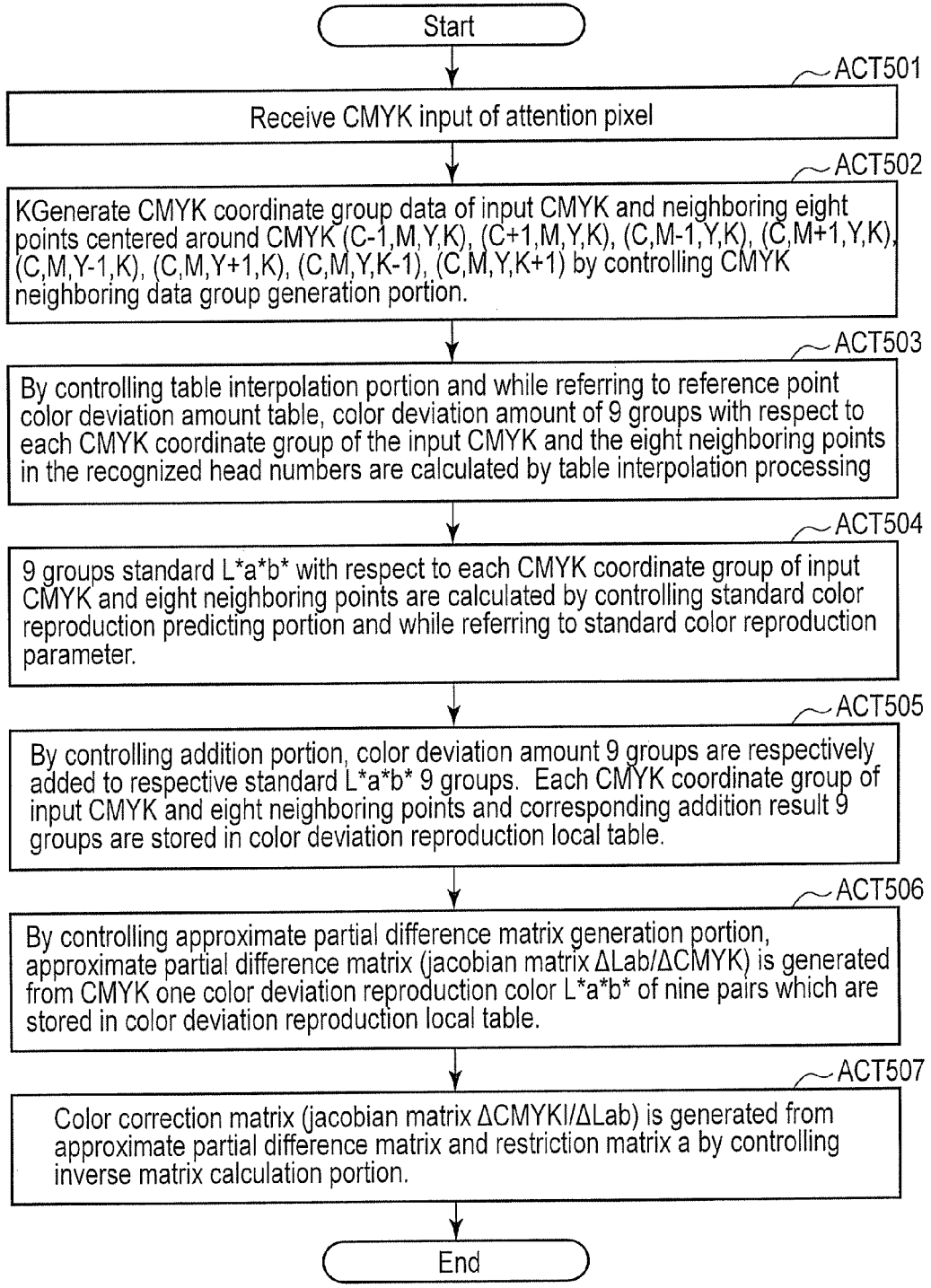
FIG. 20 is a flowchart illustrating one example of the color correction matrix generating process according to the second embodiment.

Next, the sequence and the calculation of the color correction matrix generating portion 16 will be described in detail. FIG. 20 is a flowchart illustrating one example of the color correction matrix generating processing.

The processor 1 receives the CMYK input of the attention pixels (ACT 501). Next, the processor 1 generates CMYK coordinate group data of the input CMYK and the eight neighboring points centered around the CMYK by controlling the CMYK neighboring data group generation portion 161 (by correction processing software) (ACT 502). Eight of neighboring points are represented as below.

(C−1, M, Y, K)
(C+1, M, Y, K)
(C, M−1, Y, K)
(C, M+1, Y, K)
(C, M, Y−1, K)
(C, M, Y+1, K)
(C, M, Y, K−1)
(C, M, Y, K+1)

Next, the processor 1 calculates the color deviation amounts of the group of nine which corresponds to each of the input CMYK and the eight of neighboring CMYK coordinate group of the recognized head numbers by controlling the table interpolation portion 162 (by correction processing software) while referring to reference point color deviation amount table 20 (ACT 503). Next, the processor 1 calculates a standard L*a*b* of the 9 groups with respect to each CMYK coordinate group of the eight neighboring points and the input CMYK by controlling the standard color reproduction predicting portion 163 (by correction processing software) and while referring to the standard color reproduction parameter (ACT 504). Next, the processor 1 adds the corresponding color deviation amount of the group 9 to each of the standard L*a*b*9 group by controlling the addition portion 164 (by correction processing software) (ACT 505).

Next, the CMYK coordinate groups of the input CMYK and the eight neighboring points and the corresponding calculation result 9 groups are stored in the color deviation reproduction local table 165 (ACT 505).

Next, the processor 1 approximately generates the partial differential matrix (Jacobian matrix ∂Lab/∂CMYK) from the color deviation of one color of the CMYK of nine pairs stored in the color deviation reproduction local table 165 and by a method described in the #2 by controlling the approximate partial differential matrix generating portion 166 (ACT 506). Finally, the processor 1 generates the color correction matrix (Jacobian matrix ∂CMYK/∂Lab) for the existing attention pixels using Equation (15) from the approximate partial differential matrix and the restriction matrix A by controlling the inverse conversion matrix calculation portion 167 (by correction processing software) (ACT 507).

$$\partial CMYK/\partial Lab = A \cdot inv(\partial Lab/\partial CMYK \cdot A) \qquad (15)$$

Next, the processor 1 calculates the color material correction amount ΔCMYK by the color deviation amount ΔLab and the Jacobian matrix ∂CMYK/∂Lab by controlling the color material correction amount calculation portion 17 (by correction processing software) (ACT 404). Specifically, the ΔLab may be multiplied to the Jacobian matrix ∂CMYK/∂Lab. The calculated ΔCMYK (Equation (16) below) represents the corrected amount to be subtracted from the CMYK signals in order to correct the variation of the reproduction chromaticity by the color deviation of the heads.

$$\Delta CMYK = \partial CMYK/\partial Lab \cdot \Delta Lab \qquad (16)$$

Finally, the processor 1 calculates and outputs the correction CMYK signal (CMYK') (Equation (17) below) by subtracting the CMYK correction amount ΔCMYK from the input CMYK signals by controlling the color material amount correction portion 18 (by correction processing software).

$$CMYK' = CMYK - \Delta CMYK \qquad (17)$$

By a series of the processing hereinbefore, the correction processing portion (color material correction portion 18) outputs the correction CMYK signals (CMYK') in which the influence of the color deviation of the head is corrected. The color recording portion 7 controls the discharge amount of inks from ink discharging nozzles 7211 of each recording head 721 on the basis of the correction CMYK signals (CMYK'). Therefore, the color variation between the heads is corrected.

Sequentially, when pixels to be corrected remain, the processing proceeds to next pixel and the processing described above is repeated.

<Description of Obtaining Processing of Color Deviation Amount>

FIG. 18 is a diagram illustrating one example of a configuration (data flow) of the reference point color deviation amount table updating portion 14 according to the second embodiment. The reference point color deviation amount table updating portion 14 is configured of a standard color reproduction predicting portion 141 and a subtraction portion 142.

Figure 15:
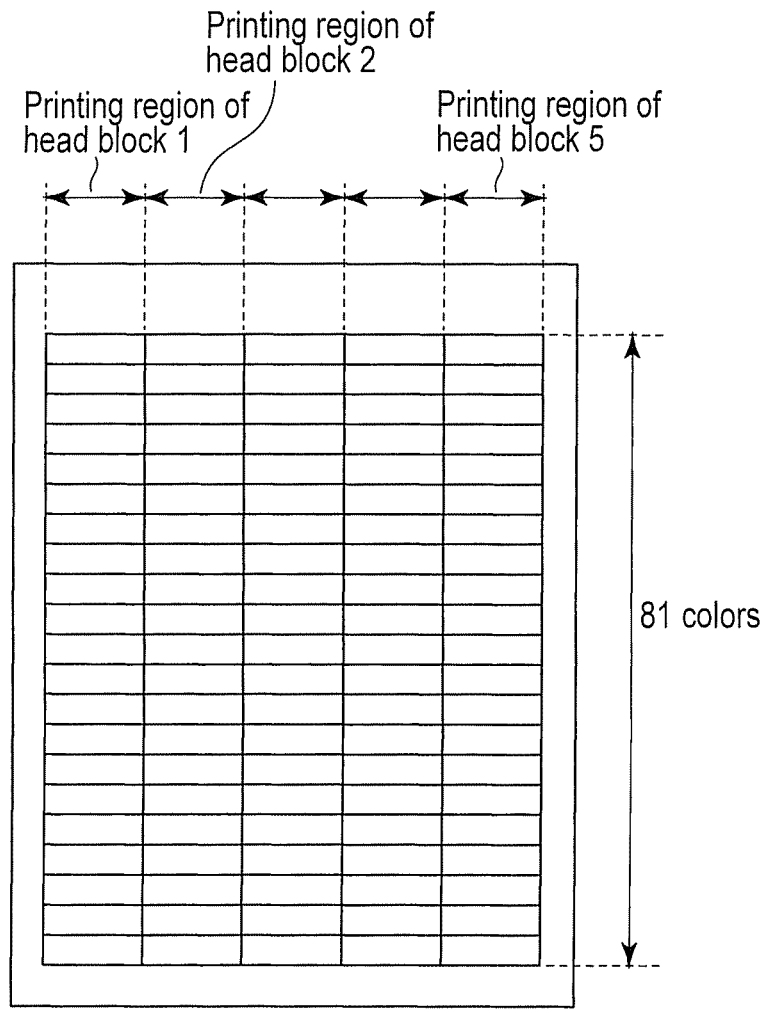
FIG. 15 is a diagram illustrating one example of a color patch according to a second embodiment.
Figure 21:
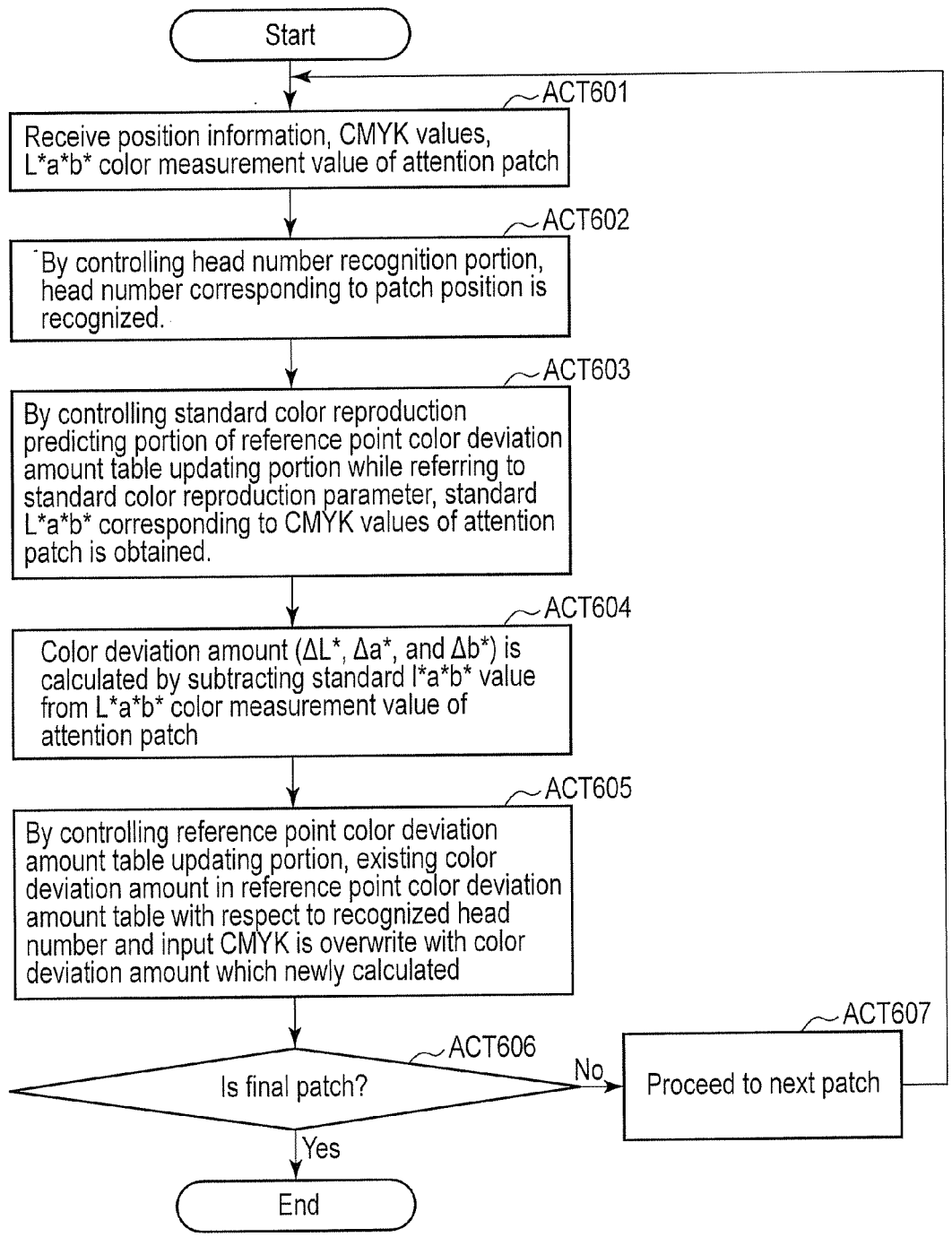
FIG. 21 is a flowchart illustrating one example of the reference point color deviation amount table updating process according to the second embodiment.

Next, the sequence and the calculation of the reference point color deviation amount table updating portion 14 will be described. The processor 1 can update the reference point color deviation amount table at each time of the image processing or the reference point color deviation amount table can be updated whenever necessary. FIG. 21 is a flowchart illustrating one example of the update processing of the reference point color deviation amount table. The processor 1 collects chromaticity L*a*b* measurement values of each color patch of the color patch chart for colors to be measured in order to measure the reference point color deviation amounts, printed by controlling the color recording portion 7 in advance through the communication and input and output interface 4 and the values are stored in the memory 2 or the auxiliary storing portion 3. FIG. 15 is a diagram illustrating one example of the color patch chart for the colors to be measured. In the color patch chart, the color patch group which corresponds to the CMYK data group of the reference points P is printed in a region on the paper sheet allocated to each head block. In an example in FIG. 15, the printing regions of the five recording head blocks are disposed in the horizontal direction so as to be equally divided the whole printing region into five sections in the horizontal direction. The color patches are disposed in parallel in the longitudinal direction by the number of the reference points P of the CMYK space in each region. For example, when the positions of the reference points P have three points in each CMYK direction as shown in FIG. 6, the amounts of $3^4=81$ color are vertically disposed.

Next, the processor 1 receives the position information of the attention color patch and the CMYK values and the stored L*a*b* measurement values (ACT 601). Next, the processor 1 recognizes the head numbers which correspond to the patch position information by controlling the head number recognition portion 11 (ACT 602). Next, the processor 1 obtains the standard L*a*b* value with respect to the CMYK value of the attention patch by controlling the standard color reproduction predicting portion 141 of the reference point color deviation amount table updating portion 14 (by correction processing software) while referring to the standard color reproduction parameter (ACT 603). Next, the processor 1 calculates the color deviation amount ΔLab by controlling the subtraction portion 142 of the reference point color deviation amount table updating portion 14 (by correction processing software) and subtracting the standard L*a*b* value from the L*a*b* chromaticity value of the attention patch (ACT 604). Finally, the processor 1 rewrites the existing color deviation amounts in the reference point color deviation amount table which correspond to the recognized head numbers and the input CMYK with the newly calculated color deviation amounts, by controlling the reference point color deviation amount table updating portion 14 (ACT 605).

Thereafter, when unprocessed color patches remain, the processor 1 proceeds to the next patch and the processing described above is repeated.

According to the color correction processing of the second embodiment described above, it is possible to correct the deviation of the chromaticity of the recording images caused by the deviation of the printing position between the heads.

In addition, according to the color correction processing of the second embodiment, it is possible to suppress the storing capacity of the measurement of the head property or the property data by obtaining ΔLab of each place from the color deviation amount of the reference point by the interpolation.

In addition, according to the color correction processing of the second embodiment, in the calculation of the color material correction amount, it is possible to perform the color material amount correction using the Jacobian matrix ∂CMYK/∂Lab without re-forming or maintaining the color profile (L*a*b*→CMYK color conversion table) for each head.

In addition, according to the color correction processing of the second embodiment, it is possible to perform the color material amount correction with high accuracy since the Jacobian matrix ∂Lab/∂CMYK, which is the original of the color material amount correction matrix (the above Jacobian matrix ∂CMYK/∂Lab), is generated on the basis of the standard color reproduction predicting value in the arbitrary CMYK.

Hereinafter, the configuration of the image forming apparatus according to the second embodiment will be summrized.

The image forming apparatus according to the second embodiment includes portion for inputting the color image signals which correspond to the recording color material amounts; chromaticity deviation amount storing portion for storing chromaticity deviation amount in a plurality of reference color points in recording color material amount coordinate space; chromaticity deviation amount calculation portion for calculating the second chromaticity deviation amount signals by reading the chromaticity deviation amounts by the chromaticity deviation amount storing portion on the basis of the input color image signal values and using the read chromaticity deviation amounts, the input color image signals; standard color reproduction parameter storing portion for storing a parameter (standard color reproduction parameter) for calculating the standard color reproduction chromaticity (standard chromaticity) which correspond to the color image signals which corresponded to the recording color material amounts; standard chromaticity calculation portion for calculating the standard chromaticity which corresponds to the input color image signal values using the standard color reproduction parameter, stored in the standard color reproduction parameter storing portion; reproduction chromaticity calculation portion for calculating the reproduction chromaticity which corresponds to the input color image signal values on the basis of the standard chromaticity and the second chromaticity deviation amounts; matrix calculation portion for calculating the matrix showing the relationship of the chromaticity change amounts and the color material correction amounts in the adjacent region in the recording color material amount coordinate space of the input color image signals using the calculated reproduction chromaticity and the input color image signals; color material correction amount calculation portion for calculating the color material correction amounts with respect to the input color image signals from the second chromaticity deviation amounts and the matrix; and color material amount correction portion for calculating the corrected color image signals from the input color image signal and the color material correction amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A color correction apparatus comprising:
    an input portion that inputs color image signals which correspond to recording color material amounts;
    a storing portion that stores a standard color reproduction parameter for calculating a standard color reproduction chromaticity and reference chromaticity deviation amounts at a plurality of reference color points in recording color material amount coordinate space; and
    a correction portion that corrects the input color image signals by estimating the chromaticity deviation amounts of the input color image signals on the basis of the reference chromaticity deviation amounts, and by calculating the standard chromaticity which corresponds to the input color image signals on the basis of the standard color reproduction parameter, and on the basis of the estimated chromaticity deviation amounts and the standard chromaticity,
    wherein the correction portion calculates a reproduction chromaticity which corresponds to the input color image signals on the basis of the estimated chromaticity deviation amounts and the standard chromaticity, calculates a matrix which represents the relationship of chromaticity change amounts and color material correction amounts in neighboring regions in the recording color material amount coordinate space of the input color image signals on the basis of the reproduction chromaticity and the input color image signals,
    calculates the color material correction amounts with respect to the input color image signals on the basis of the estimated chromaticity deviation amounts and the matrix, and calculates corrected color image signals on the basis of the input color image signals and the color material correction amounts, and
    calculates the corrected color signals by estimating the chromaticity deviation amounts for each head block when an image is formed by a head block row configured of a plurality of head blocks including a plurality of heads which correspond to a plurality of colors.

2. The apparatus according to claim 1,
    wherein the correction portion estimates the chromaticity deviation amounts of the input color image signals which are not included among the reference color points on the basis of the reference chromaticity deviation amounts in the plurality of reference color points.

3. The apparatus according to claim 1,
    wherein the correction portion estimates the chromaticity deviation amounts of the input color image signals which are not included among the reference color points by the interpolation on the basis of the reference chromaticity deviation amounts in the plurality of reference color points.

4. The apparatus according to claim 1,
    wherein the correction portion estimates the chromaticity deviation amounts of the input color image signals which are not included among the reference color points by the interpolation on the basis of pixel position information of the input color image signals, the input color image signals and the reference chromaticity deviation amounts in the plurality of reference color points.

5. The apparatus according to claim 1, wherein the input portion inputs CMYK signals which correspond to the color image signals.

6. The apparatus according to claim 5,
    wherein the correction portion corrects the input CMYK signals on the basis of the estimated chromaticity deviation amounts and the standard chromaticity.

7. The apparatus according to claim 1,
    wherein the storing portion stores the chromaticity deviation amounts in at least two places within a printing range in the same head block in each reference color point.

8. The apparatus according to claim 7,
    wherein the correction portion calculates a reproduction chromaticity which corresponds to the input color image signals on the basis of the estimated chromaticity deviation amounts and the standard chromaticity, calculates a matrix which represents the relationship of chromaticity change amounts and color material correction amounts in neighboring regions in the recording color material amount coordinate space of the input color image signals on the basis of the reproduction chromaticity and the input color image signals, calculates the color material correction amounts with respect to the input color image signals on the basis of the estimated chromaticity deviation amounts and the matrix, and calculates the corrected color image signals on the basis of the input color image signals and the color material correction amounts.

9. The apparatus according to claim 7, wherein the correction portion estimates the chromaticity deviation amounts of the input color image signals which are not included among the reference color points on the basis of the reference chromaticity deviation amounts in the plurality of reference color points.

10. The apparatus according to claim 7, wherein the correction portion estimates the chromaticity deviation amounts of the input color image signals which are not included among the reference color points by the interpolation on the basis of the reference chromaticity deviation amounts in the plurality of reference color points.

11. The apparatus according to claim 7, wherein the correction portion estimates the chromaticity deviation amounts of the input color image signals which are not included among the reference color points by the interpolation on the basis of pixel position information of the input color image signals, the input color image signals and the reference chromaticity deviation amounts in the plurality of reference color points.

12. The apparatus according to claim 7, wherein the input portion inputs CMYK signals which correspond to the color image signal.

13. The apparatus according to claim 12, wherein the correction portion corrects the input CMYK signals on the basis of the estimated chromaticity deviation amounts and the standard chromaticity.

14. A color correction processing method, comprising:
inputting color image signals which correspond to recording color material amounts;
estimating chromaticity deviation amounts of the input color image signals on the basis of reference chromaticity deviation amounts at a plurality of reference color points in recording color material amount coordinate space;
calculating a standard chromaticity which corresponds to the input color image signals on the basis of a standard color reproduction parameter for calculating a standard color reproduction chromaticity;
correcting the input color image signals on the basis of the estimated chromaticity deviation amounts and the standard chromaticity;
calculating a reproduction chromaticity which corresponds to the input color image signals on the basis of the estimated chromaticity deviation amounts and the standard chromaticity, and calculating a matrix which represents the relationship of chromaticity change amounts and color material correction amounts in neighboring regions in the recording color material amount coordinate space of the input color image signals on the basis of the reproduction chromaticity and the input color image signals,
calculating the color material correction amounts with respect to the input color image signals on the basis of the estimated chromaticity deviation amounts and the matrix, and calculating corrected color image signals on the basis of the input color image signals and the color material correction amounts; and
calculating the corrected color signals by estimating the chromaticity deviation amounts for each head block when an image is formed by a head block row configured of a plurality of head blocks including a plurality of heads which correspond to a plurality of colors.

15. The method according to claim 14, comprising:
estimating the chromaticity deviation amounts of the input color image signals which are not included among the reference color points on the basis of the reference chromaticity deviation amounts in the plurality of reference color points.

16. The method according to claim 14, comprising:
estimating the chromaticity deviation amounts of the input color image signals which are not included among the reference color points by the interpolation on the basis of the reference chromaticity deviation amounts in the plurality of reference color points.

17. The method according to claim 14, comprising:
estimating the chromaticity deviation amounts of the input color image signals which are not included among the reference color points by the interpolation on the basis of pixel position information of the input color image signals, the input color image signals and the reference chromaticity deviation amounts in the plurality of reference color points.

18. The method according to claim 14, comprising:
storing the chromaticity deviation amounts in at least two places within a printing range in the same head block in each reference color point.

* * * * *